United States Patent [19]

Galligan et al.

[11] Patent Number: 4,783,307
[45] Date of Patent: Nov. 8, 1988

[54] REACTOR CONTROL SYSTEM VERIFICATION

[75] Inventors: James J. Galligan, Joliet; Harry W. Quinlan, Frankfort; Steven J. Hedden, Morris, all of Ill.

[73] Assignee: Commonwealth Edison Company, Chicago, Ill.

[21] Appl. No.: 22,947

[22] Filed: Mar. 5, 1987

[51] Int. Cl.⁴ .............................................. G21C 7/36
[52] U.S. Cl. ..................................... 376/217; 376/216; 364/579; 364/580
[58] Field of Search ................... 376/215, 216, 217; 364/550, 551, 552, 553, 579, 580, 138, 140, 147

[56] References Cited

U.S. PATENT DOCUMENTS

| | | | |
|---|---|---|---|
| 3,437,556 | 4/1969 | Bevilacqua et al. | 376/215 |
| 3,681,577 | 8/1972 | Gasiunas | 235/151.3 |
| 3,866,109 | 2/1975 | Reed et al. | 322/15 |
| 3,873,817 | 3/1975 | Liang | 235/151.21 |
| 3,931,500 | 1/1976 | Berkebile et al. | 235/151.21 |
| 4,008,455 | 2/1977 | Pedersen | 340/1 R |
| 4,060,716 | 11/1977 | Pekrul et al. | 364/576 |
| 4,102,175 | 7/1978 | Foster | 73/4 R |
| 4,192,005 | 3/1980 | Kurtz | 364/571 |
| 4,198,677 | 4/1980 | Brunner et al. | 364/571 |
| 4,254,469 | 3/1981 | Whitely | 364/571 |
| 4,293,916 | 10/1981 | Del Re et al. | 364/571 |
| 4,303,984 | 12/1981 | Houvig | 364/571 |
| 4,330,367 | 5/1982 | Musick | 376/245 |
| 4,339,410 | 7/1982 | Satou | 376/216 |
| 4,364,027 | 12/1982 | Murooka | 340/347 |
| 4,427,620 | 1/1984 | Cook | 376/216 |
| 4,434,132 | 2/1984 | Cook | 376/259 |
| 4,440,716 | 4/1984 | Smith | 376/247 |
| 4,478,783 | 10/1984 | Broadwater | 376/211 |
| 4,512,949 | 4/1985 | Smith | 376/247 |
| 4,517,154 | 5/1985 | Dennis et al. | 376/259 |
| 4,547,859 | 10/1985 | Wiggins | 364/571 |
| 4,552,718 | 11/1985 | Impink, Jr. et al. | 376/216 |
| 4,574,068 | 3/1986 | Hill | 376/259 |
| 4,582,672 | 4/1986 | Tuley, Jr. et al. | 376/254 |
| 4,585,609 | 4/1986 | Le Rat | 376/245 |
| 4,608,223 | 8/1986 | Twilley, Jr. | 376/247 |
| 4,608,657 | 8/1986 | Manome et al. | 364/571 |
| 4,615,321 | 10/1986 | Haefner et al. | 123/479 |
| 4,664,870 | 5/1987 | Hajer | 376/215 |
| 4,687,623 | 8/1987 | Cook | 376/259 |
| 4,692,299 | 9/1987 | Crew | 376/216 |
| 4,697,093 | 9/1987 | Sutherland | 307/38 |

OTHER PUBLICATIONS

Exerpt from the official transcript of meeting of United States of America Nuclear Regulatory Commission on Jun. 30, 1987 regarding "Discussion/Possible Vote on Full Power Operating License for Braidwood-1."

Primary Examiner—Donald P. Walsh
Attorney, Agent, or Firm—Emrich & Dithmar

[57] ABSTRACT

A computer controlled system and method accurately and rapidly verifies the in-place, dynamic response of a transducer/sensor to a time dependent state variable. The verification system includes a programmable ramp generator which introduces a time varying signal simulating a time dependent state variable, e.g., pressure, temperature, flow rate, etc., to a protection system such as used in a nuclear reactor power plant. The verification system further includes means for measuring and displaying the response of the protection system to input signal variation over time. The verification system and method ensures that the protection system outputs an appropriate control signal, such as a shutdown signal, for terminating nuclear reactor power plant operation when the magnitude or time dependent variation of the state variable is not within predetermined limits.

74 Claims, 14 Drawing Sheets

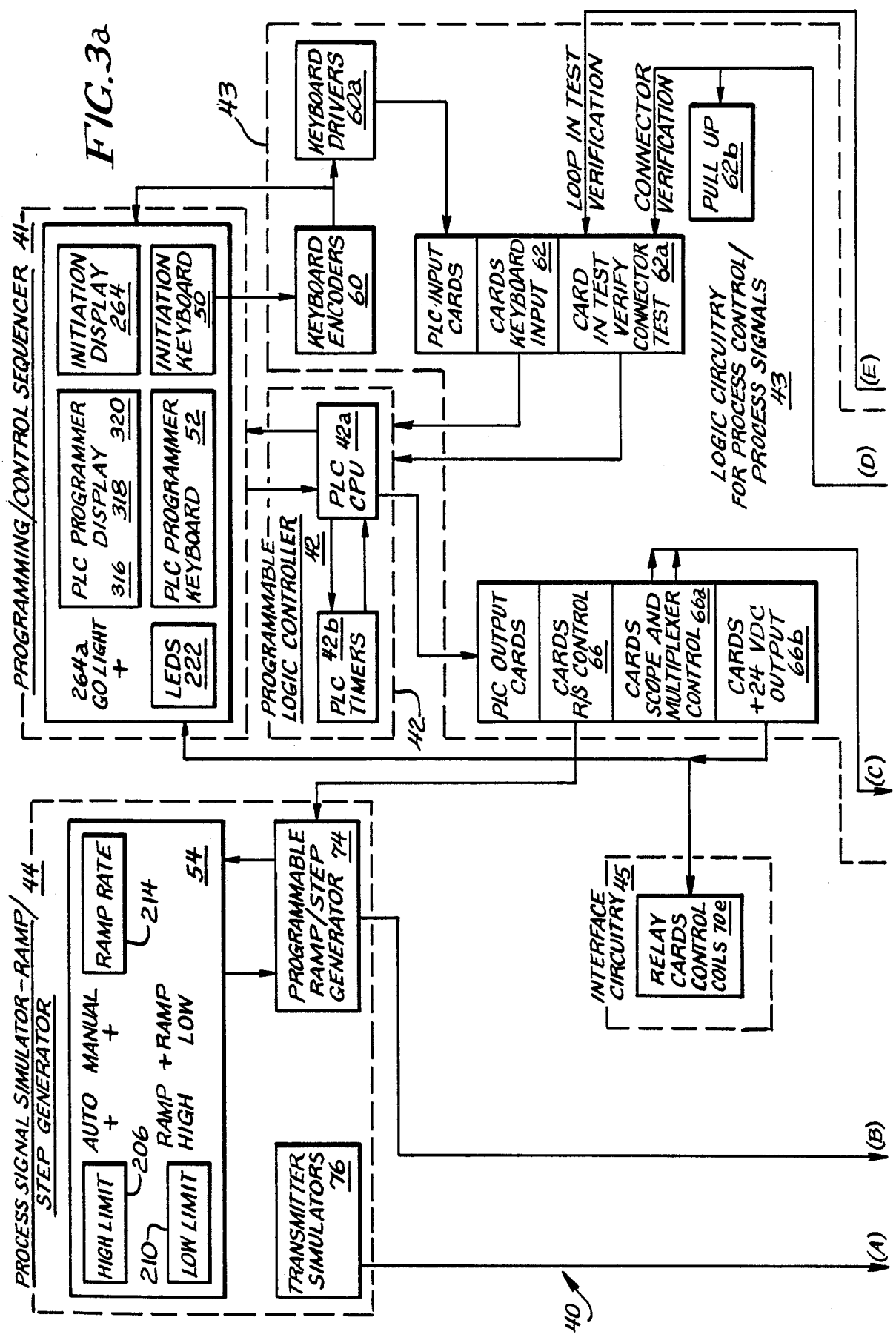

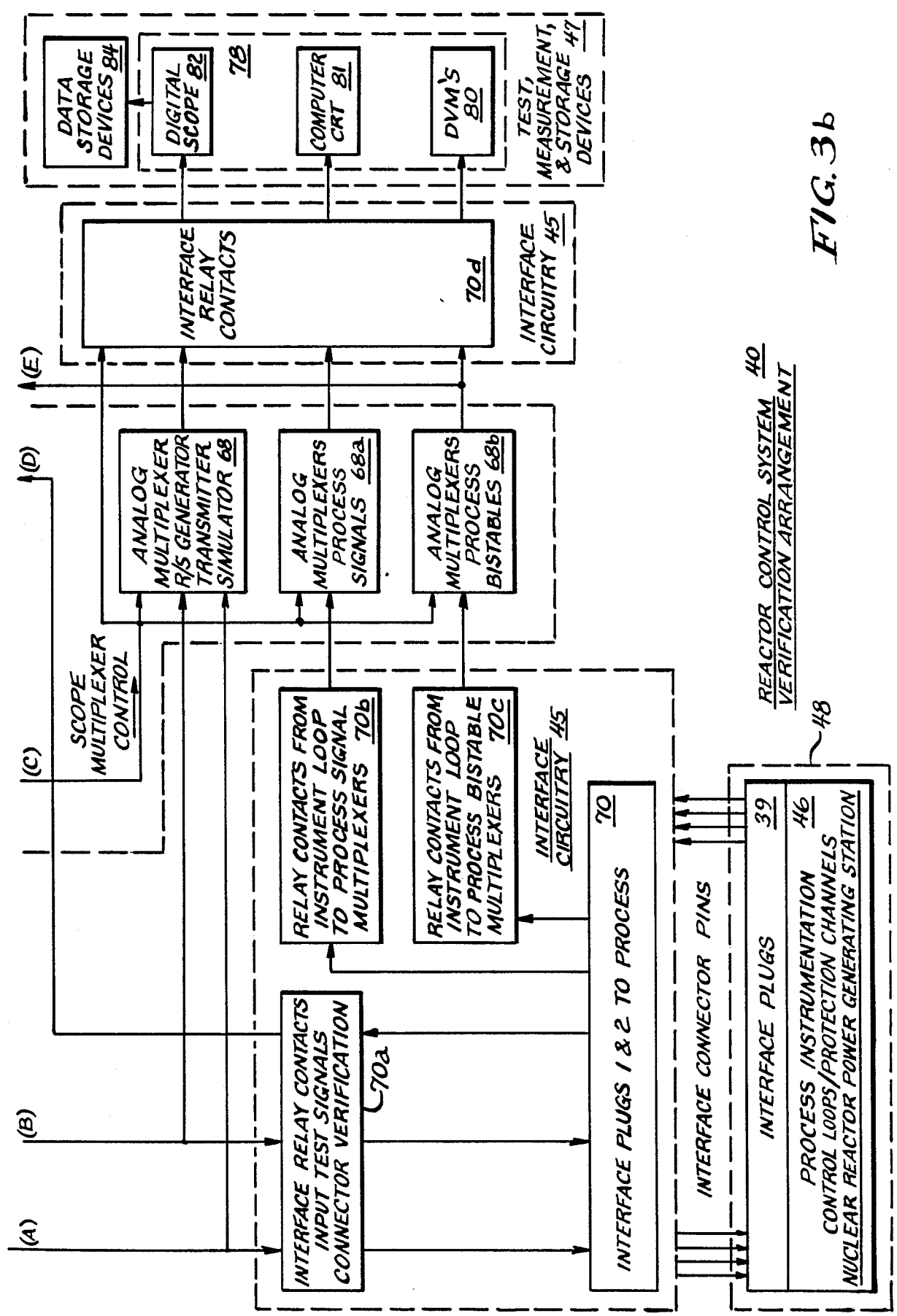

FIG. 9
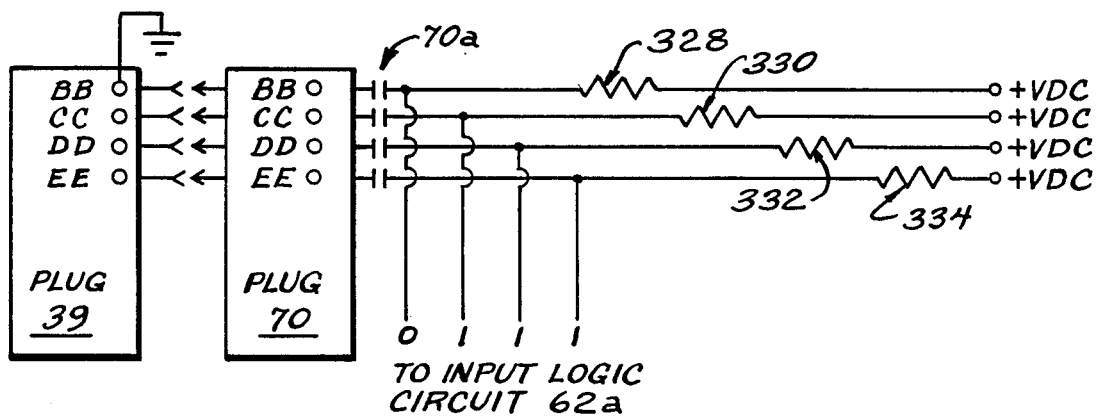
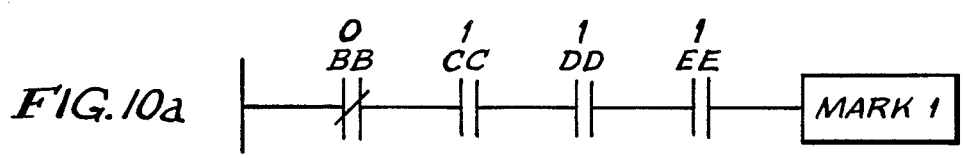
FIG. 10a
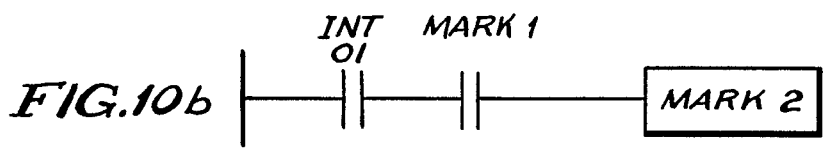
FIG. 10b

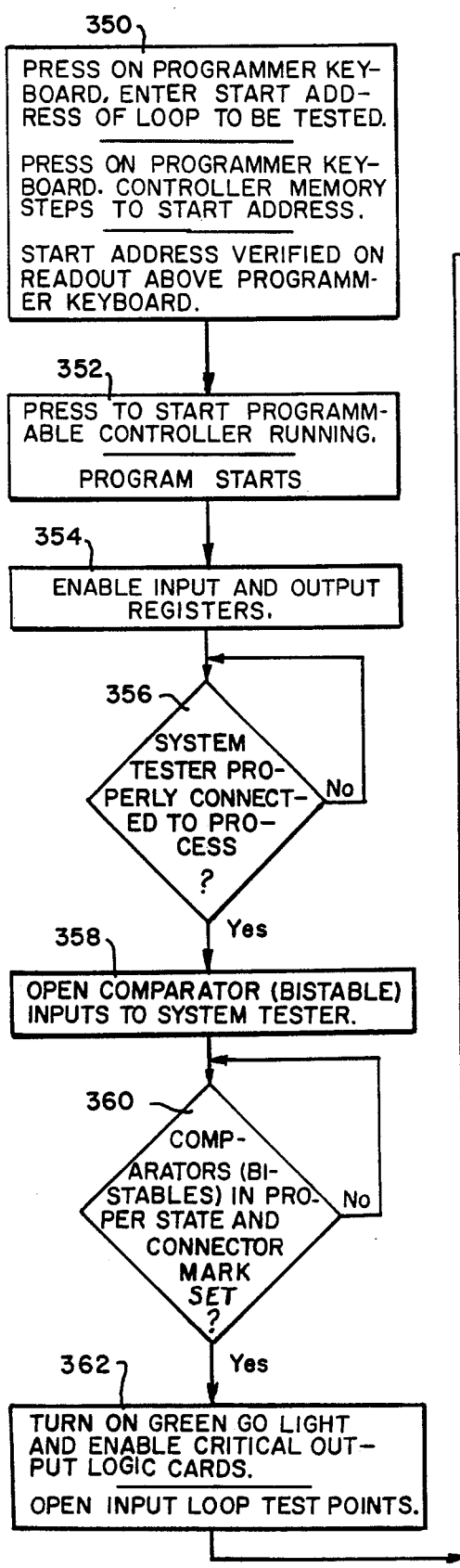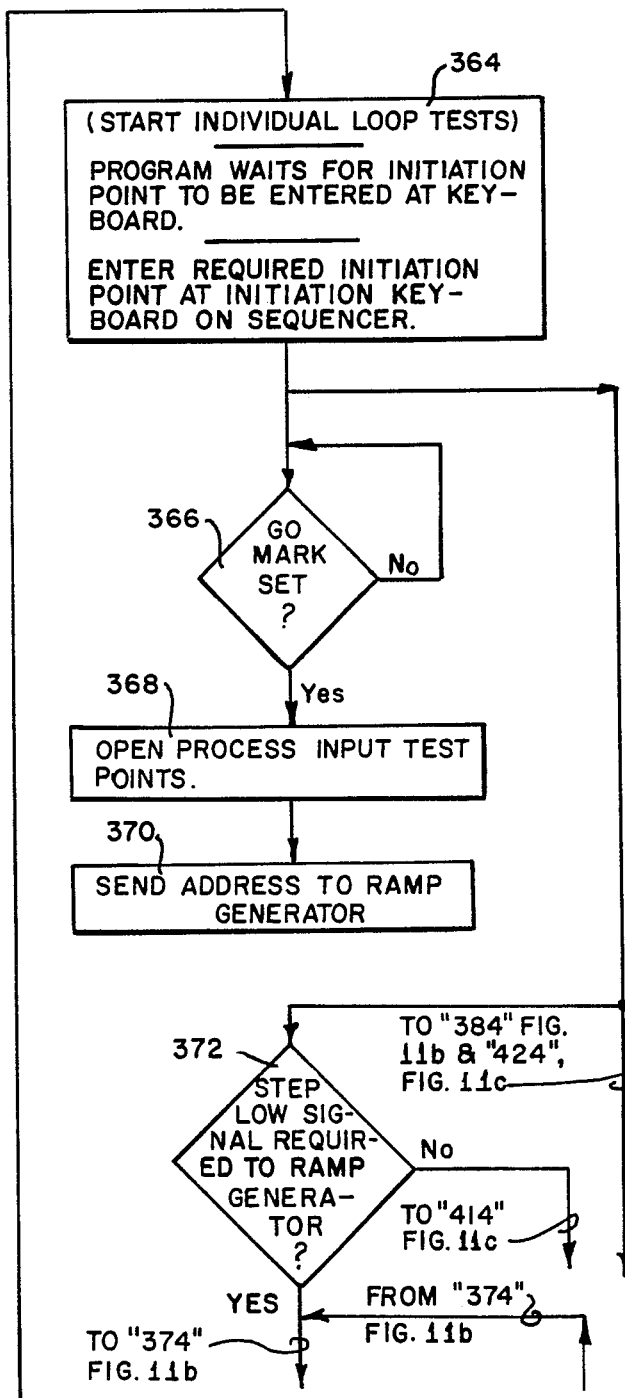
FIG. 11a
FLOW DIAGRAM TEST SEQUENCE

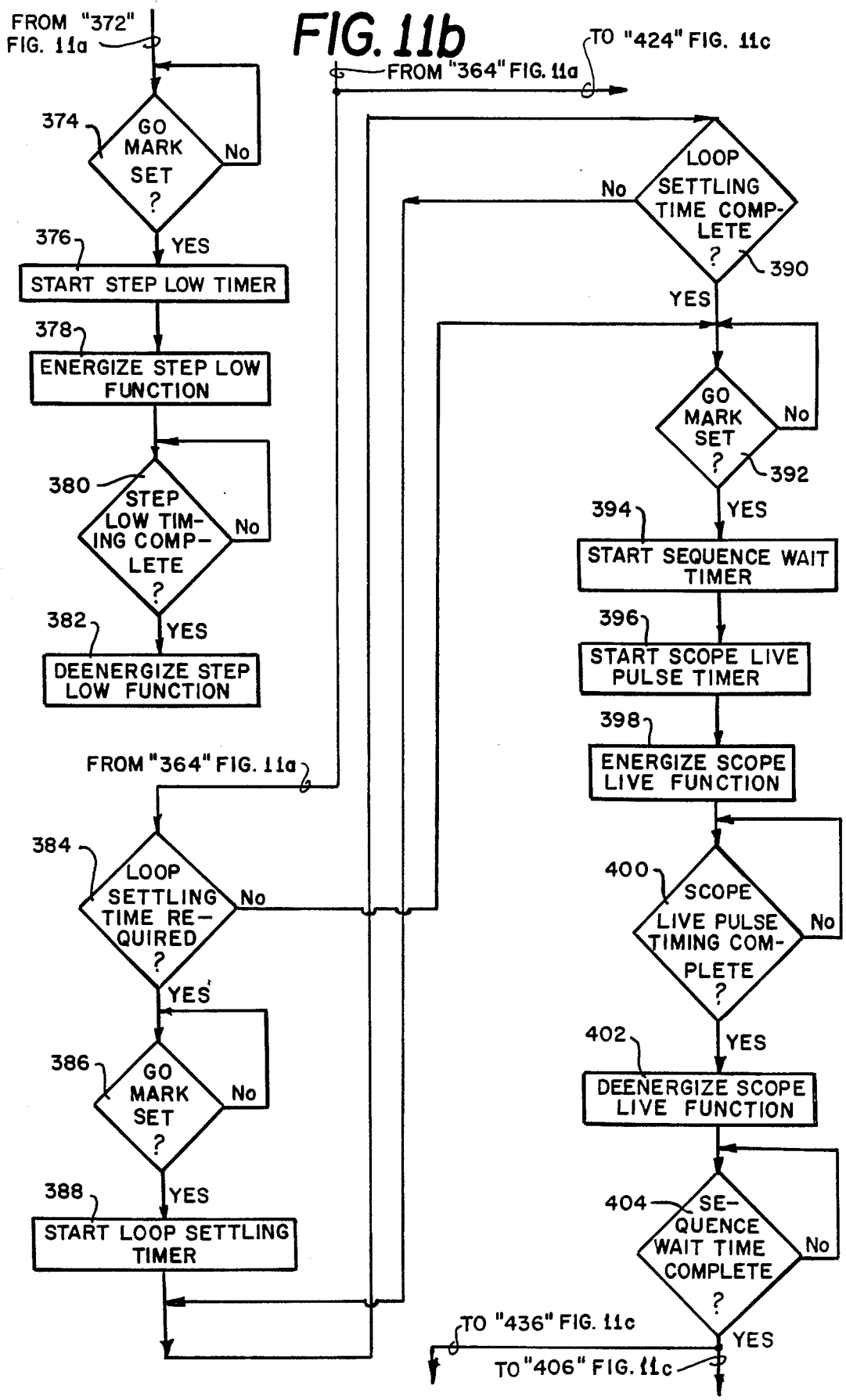

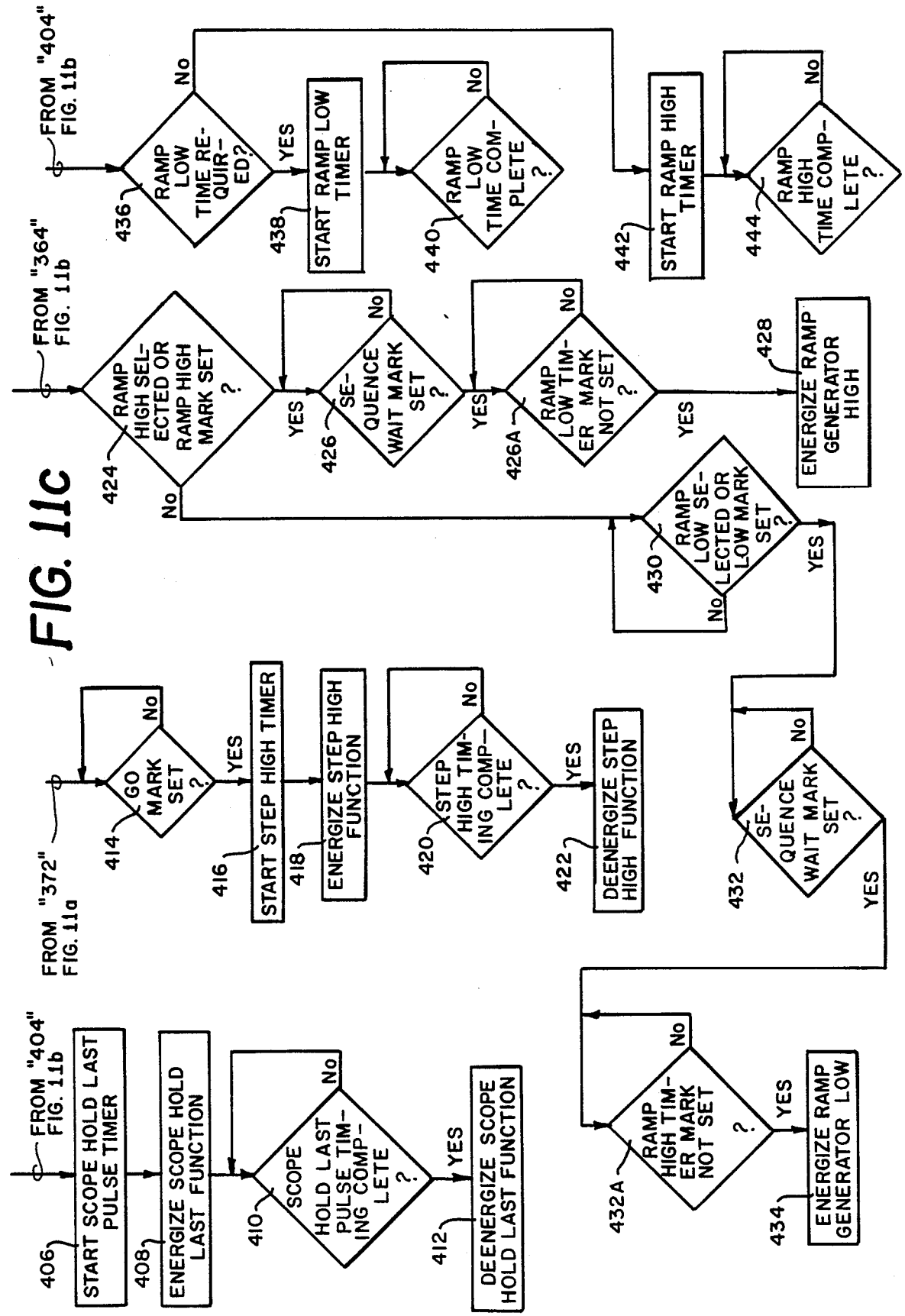

REACTOR CONTROL SYSTEM VERIFICATION

BACKGROUND OF THE INVENTION

This invention relates generally to the in-place verification of the operation of a control system that includes time dependent state variables and is particularly directed to the verification of a protection system for a nuclear reactor power plant.

In the operation of plant process systems such as those involving pressures, temperatures, flows, and levels, the measured steady state and transient values of these state variables are utilized for the control and protection of the plant. A record of the values of these measurements made over a period of time can be used for locating and correcting system and equipment problems.

Control and protection systems monitor information from sensors or transducers that convert the values of process parameters like pressure, temperature, or flow into analog or digital signals taking on various forms like electrical, optical, or electromagnetic waves. Plant control and protection system circuitry is designed to react to these signals transmitted by the sensors so as to maximize plant efficiency and also to shut down the process if the values of the parameters approach an operating condition that may endanger personnel or equipment.

It is therefore very important that the control and protection circuitry be kept in close tolerance to design set points so that plant safety and efficiency are assured. This is especially critical for nuclear driven steam supply systems such as boiling water reactor (BWR) and pressurized water reactor (PWR) electric generating plants. Operation of these plants is closely regulated by such agencies as the Nuclear Regulatory Commission. Procedures for assuring that protection and control circuitry are within specified tolerances for the safe operation of a plant are closely followed. These procedures include periodic testing routines that specify exacting/precise measurement tolerances to conform to the allowable variance of the process parameter including transients.

A typical prior art sensor monitoring arrangement and method 10 is shown in simplified schematic and block diagram form in FIG. 1. The sensor monitoring arrangement 10, which is also known as an instrument loop, a process loop, a string, or a protection channel as used at a PWR electric generating plant, includes a transducer or sensor 12 installed at a location where the state variable is to be measured. The state variable being measured may be pressure, temperature, fluid level, fluid flow rate, etc. the transducer/sensor 12 includes a resistor 16 coupled to a power supply 14 in forming a first current loop 18. A first switch 20 may be coupled between the power supply 14 and the transducer/sensor 12 which converts the pressure, temperature, etc., value to an electric current signal. The power supply 14 establishes the electric current from the transducer/sensor 12 at a particular ambient signal level and a test point A is typically provided between the transducer/sensor and the power supply to allow for monitoring of the output signal from the transducer/sensor. The power supply 14 also typically converts the transducer/sensor output signal in terms of pounds per square inch (PSI), degrees Fahrenheit, etc., for the purpose of providing a visual indication, and in some cases an aural alert, of the signal level on a gauge or other visual display (not shown).

The power supply 14 is further coupled by means of a voltage loop 24 to a dynamic compensating circuit 30 that compensates for variations and transients in one of the aforementioned time dependent state variables. The dynamic compensating circuit 30 may provide either lead/lag, lead, lag, or proportional compensation, although only lead/lag compensation is considered in the following paragraphs for simplicity. The dynamic compensating circuit 30 is, in turn, coupled by means of a voltage loop 25 to a trip circuit 22. The trip circuit 22 provides a correction or shutdown signal to a protection system 28 when the signal level is outside of a predetermined window or range. A second switch 26 is typically coupled between the trip circuit 22 and the protection system 28 to allow for monitoring of the correction or shutdown signal output by the trip circuit at test point C. Although illustrated as being separate from the protection system 28 in FIG. 1 for purposes of the present discussion, the sensor monitoring arrangement 10 is generally considered to be within and a part of the protection system. For safety and reliability, it is common to install a plurality of transducer/sensors and associated protection loops for monitoring a particular process parameter in a nuclear reactor power generating station. The protection system 28 is typically activated when more than one of the sensors monitoring or protection circuits detects a predetermined minimum or maximum signal level for shutting down power generating station operation.

An important part of the process in a nuclear reactor power generating station is its ability to sense transients or excursions in the process parameters and to respond to the excursion by altering the signal level in the protection circuit in such a manner so as to accelerate the response of the protection circuit to a potentially hazardous condition. As an example, assume that a protection circuit is to be activated for a low pressure of 1800 psi where normal pressure is 2100 psi. Calibration of the protection circuitry for a normal pressure of 2100 psi might result in an output signal of 6.200 volts, with 3.200 volts for 1800 psi corresponding to the specified trip point and 4.200 volts used for resetting the trip circuit at 1900 psi. However, in the operation of a process system there is a distinct difference between a slow pressure change from a normal value of 2100 psi to 1800 psi and a precipitous drop in pressure over a relatively short time period. To compensate for this rapid change in a state variable, some protection systems, such as those typically employed in reactor power plants, include the dynamic compensating circuit 30 for changing the signal from the sensor so that it increases or decreases exponentially in relation to the rate of change of the signal from the sensor. For example, if the pressure were to drop from 2100 psi to 1900 psi very rapidly, the output from the dynamic compensating circuit might produce a signal voltage of less than 3.200 volts repesenting the 1800 psi trip point, resulting in a shutdown output from the trip circuit 22 and activation of the protection system 28. Later when the pressure levels off at 1900 psi, the signal voltage level at the output of the dynamic compensating circuit 30 would increase from the trip level to 4.200 volts and the trip circuit 22 would be reset.

The accurate calibration of these protection and control circuits is essential for the proper operation and may be critically important such as in a nuclear reactor power generating plant. Consequently, in-place checks are made of various portions of the process loop and protection system of the reactor power plant on a routine basis and each of the discrete circuit boards is calibrated, with some discrete circuit boards required to be removed from the control system and placed in a special test fixture. Specifications for the calibration of these circuits are very stringent, with narrow tolerances. For example, a normal trip point for a pressure may be specified at 1885 psi, but never lower than 1871 psi. Such tolerances at signal voltages in the range of zero to ten volts may require measurement accuracies on the order of 25 millivolts. This requires the use of highly accurate digital voltmeters with a technician recording the signal level at the time of trip as accurately as humanly possible.

Prior to the present invention, a simplified, typical in-place calibration check procedure for a protection or sensor monitoring arrangement 10 similar to that of FIG. 1 would be as follows: the first and second switches 20 and 26 would be opened, isolating the protection system 28 from the transducer/sensor 12 and the trip circuit 22. Great care is taken to ensure that the correction/protection monitoring circuit and its related switches are properly selected, since errors can result in the accidental tripping of the entire plant process. Once isolated and the dynamic compensation characteristic, a variable signal generator (not shown) is coupled to signal injection point B for generating a trip signal. The test signal is then manually varied from its normal value to a value beyond the trip point and is then returned to a value within the reset limit. In the above example for a reactor power plant, the signal generator would typically be varied from 6.200 volts to a value somewhat less than 3.200 volts and then increased above 4.200 volts. The values at trip and reset are judgmentally noted at test point C which is an LED on a card. The exact values at trip and reset are recorded by a technician using a digital voltmeter connected at test point C. To be within tolerance limits, these values must be 3.200± channel allowable tolerance and 4.200± allowable reset tolerance, respectively. The procedure described above would be performed with the dynamic compensating circuit 30 shorted out since there is no provision made to coordinate the measured values of the manually ramped signal provided by the signal generator with the signal provided to the dynamic compensating circuit and the tripping signal provided to the trip circuit 22. In order to perform a meaningful in-place test of the control/process system with the dynamic compensation circuit 30 in the circuit and not shorted out, the signal voltages must all be measured at precisely the same time and must be within a very narrow ± channel allowable tolerance of the designated value. In addition, the ramping signal must precisely match the operating characteristics of the dynamic compensating circuit 30.

One prior art approach for recording this operating data involves the use of strip charts where inked pens record the signal values. However, the width of these inked lines alone is normally greater than the allowable tolerance, making these instruments impractical in this application. Moreover, the dynamic compensating circuit 30 is maintained in specification by periodically removing it from the sensor monitoring circuit 10 and calibrating it on a special test fixture. However, this procedure does not allow for "in-place" verification of its correct operation. In addition, the time required for a complete check of the sensor monitoring circuit 10 and the protection system 28, even with the dynamic compensating circuit 30 shorted out, is approximately 30 minutes. Because of the large number of these sensor monitoring circuits in a typical power generating reactor station, this verification and calibration operation is essentially continuous. This is particularly the case when bench calibration of the dynamic compensating circuit 30 is performed, a procedure which must be carrried out even if it is not out of calibration, since prior art approaches do not afford "in-place" checking of this sub-system. Finally, as indicated above, a reduced number of sensors is available in "in service" plant protection during this vertification and calibration procedure for monitoring reactor operation. This reduction in the number of sensors during the in-place testing results in a corresponding reduction in the reliability and accuracy of the reactor protection system and increases the risk of an inadvertent trip of the plant process. It is, of course, desirable to maximize the safety factor and minimize the risk in such an environment by minimizing the time of testing.

The present invention overcomes the aforementioned limitations of the prior art by providing for the dynamic verification of the operation of a nuclear power reactor protection system which monitors time dependent state variables of a nuclear reactor power plant and minimizes the time necessary for this testing. The computer controlled verification system of the present invention is capable of verifying the operation of a transducer/sensor monitoring circuit in the protection system which includes a dynamic compensation circuit from input to output using an in-place test. The present invention more accurately measures transducer and protection system operation, reduces the time necessary for transducer and protection system verification, and verifies system operation by introducing a precisely controlled simulation signal.

OBJECTS OF THE INVENTION

Accordingly, it is an object of the present invention to provide improved process control by more accurately monitoring a time dependent state variable characteristic of the process.

It is another object of the present invention to provide fast, accurate, in-place, dynamic verification of a transducer system responsive to a time dependent state variable.

It is yet another object of the present invention to measure the response to a dynamic compensating circuit in a transducer/sensor system to permit more accurate monitoring of a time dependent state variable input to the transducer/sensor system.

A further object of the present invention is to analyze the response, i.e., trip and reset points, of a sensor responsive to a time dependent state variable input signal.

A still further object of the present invention is to provide a means and method for measuring the time response of an in situ sensor in a nuclear reactor to verify sensor time response operability criteria established by nuclear safety standards.

Yet another object of the present invention is to provide portable means for field testing time dependent, state variable responsive transducers in an expeditious manner.

Another object of the present invention is to improve the accuracy and reliability of sensor systems in a nuclear reactor power station.

A still further object of the present invention is to verify the operation of a protection system for a nuclear reactor power generating station by providing precisely controlled signals which closely simulate reactor operating parameters.

Still another object of the present invention is to more accurately and reliably measure and record the operation of a protection arrangement for an operating system.

It is another object of the present invention to provide an improved system and method for troubleshooting a protection arrangement for an operating system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 3a and 3b illustrates the reactor power generating station protection system verification arrangement of FIG. 2 in greater detail in block diagram form;

FIG. 9 is a simplified schematic and block diagram of an arrangement for verifying proper connection of a plug used in coupling the verification system of the present invention to a protection system;

FIGS. 10a and 10b illustrate the manner in which the connector plug verification arrangement of FIG. 9 can also be used to verify execution of the proper test signal operation by the protection system verification arrangement of the present invention; and FIGS. 11a, 11b and 11c respectively illustrate different portions of a single flow chart representing the sequence of operations carried out by the verification arrangement of the present invention in verifying the operation of a nuclear reactor power plant protection system.

DETAILED DESCRIPTION OF THE PREFERRED EMBODIMENT

Figure 2:
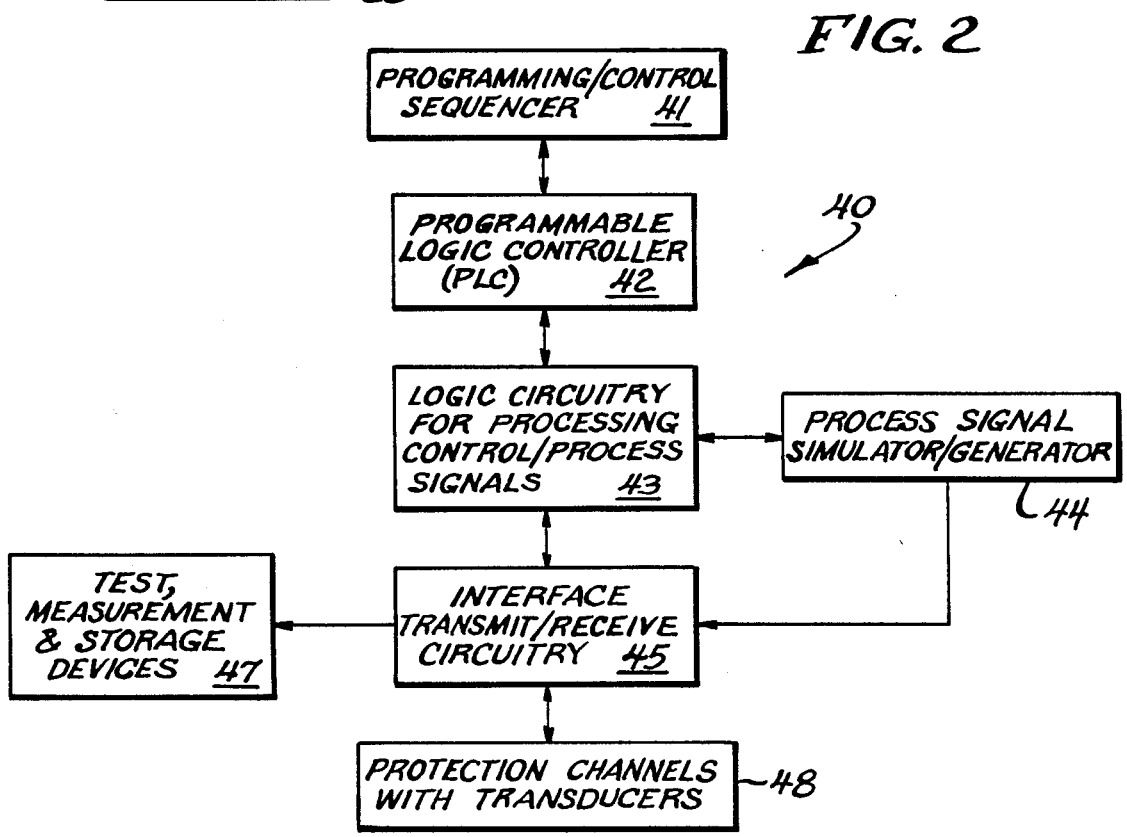
FIG. 2 is a simplified block diagram of an arrangement for verifying the operation of a nuclear reactor power generating station protection or control system in accordance with the present invention.

Referring to FIG. 2, there is shown a simplified block diagram of a verification system 40 in accordance with the present invention.

The verification system 40 is intended for use with a nuclear reactor power generation station having a protection system which includes a plurality of protection channels 46 with transducers or sensors. The protection channels 46 monitor various operating parameters of the nuclear reactor power generating station and output appropriate shutdown, or control, signals when an operating parameter exceeds a predetermined upper or lower limit. As used herein, control signals refer to those signals generated within and output by the verification system 40, while process signals refer to those signals produced by the protection system or the operating system with which the protection system is used. The verification system 40 of the present invention monitors and verifies proper operation of the protection system and ensures that the protection system is responsive to changes in the operating characteristics of the power generating station for controlling, and in some cases shutting down, reactor operation when undesirable, and sometimes unsafe, operating conditions exist.

The protection channels 46 provide monitoring for various operating parameters such as temperature, pressure, water level, etc. A protection system which includes the protection channels 46 controls the operation of the power generating stations in accordance with approved limiting values of these operating parameters. Thus, if a change in an operating parameter exceeds a given limit or a given limit over a predetermined time interval, the protection system responds by outputting an appropriate control or shutdown signal to the power generating station. While the present invention is intended for use with the Westinghouse 7300 nuclear reactor process control system, the principles of the invention are applicable to such control systems in general and the present invention is thus not limited to operation with the aforementioned Westinghouse system. In the aforementioned Westinghouse 7300 process control system, either three or four protection channels or instrument loops are typically used to monitor a single operating parameter, with an out-of-tolerance condition detected by at least two of the three or four process loops before a shutdown signal is provided to the power generating station for terminating its operation.

The protection channels 46 provide process signals via interface transmit/receive circuitry 45 to logic circuitry 43 for processing the control signals. In the present invention, simulated process signals are provided to the logic circuitry 43 and the interface transmit/receive circuitry 45 for processing process signals from a process signal simulator/generator 44. Operation of the logic circuitry 43 is controlled by a programmable logic controller 42 (PLC) which is responsive to user initiated inputs to a programming/control sequencer 41. The operating parameter simulation signals provided to the logic circuitry 43 and the interface transmit/receiver circuitry 45 from the process signal/simulator generator 44 are processed therein in accordance with an operating program stored in the PLC as well as in response to user initiated inputs to the programming/control sequencer 41. The output signals from the logic circuitry 43 for processing control/process signals are provided to test, measurement and storage devices 47 via interface transmit/receive circuitry 45 and represent the operating characteristics of the protection system in response to the simulated operating signals provided thereto. By observing and recording the output signals from the logic circuitry 43 via interface transmit/receive circuitry 45 on the test, measurement and storage devices 47, a system operator may observe protection system operation, compare protection system operation with predetermined operating limits, and either verify proper protection system operation or detect improper protection stystem operation and take appropriate corrective steps.

Referring also to FIGS. 3a and 3b, which illustrates the present invention in greater detail, additional details of the reactor control system verification arrangement 40 of the present invention will now be described. In the following discussion it should be kept in mind that FIGS. 3a and 3b is a simplified illustration of the present invention and does not contain details which would be familiar to those skilled in the art. For example, while FIGS. 3a and 3b shows interface relays 70a, 70b, 70c, 70e as being only in interface circuitry 45 and multiplexers 68 as being only in logic circuitry for processing control/process signals 43, it should be understood that other circuitry within the verification arrangement 40 may also include interface relays and multiplexers, although this is not shown in the figure of simplicity.

The verification system 40 further includes an initiation keyboard 50 and a programmer keyboard 52 within the programming/control sequencer 41. The programmer keyboard includes readout displays 316, 318, 320 for providing visual indication to an operator of the status of the verification system 40 as well as instructions as to its operation. The initiation keyboard 50 includes readout display 264 to provide visual indication of the initiation point selected for testing. The programmer keyboard 52 and the initiation keyboard 50 include respective operator responsive keyboards by means of which an operator may enter commands for programming and controlling the operation of the verification system 40 as described below.

Operator initiated control inputs are provided from the initiation and programmer keyboards 50, 52. The initiation keyboard 50 provides commands to a plurality of digital encoders 60, to keyboard drivers 60a and thence to input logic circuitry 62. The programmer keyboard 52 provides commands to a plurality of digital encoders within the PLC (CPU) 42a. The digitally encoded commands entered on the initiation keyboard 50, which include various test commands, are then provided from the input logic circuitry 62 to the programmable logic controller (PLC) 42. The digitally encoded commands entered on the programming keyboard 52, which include various programming and operational commands are provided to the PLC 42 for initial system programming and during the start of testing operations. PLC 42 has an electrically programmable read only memory (EPROM) therein and is manufactured by Kuhnke GmbH of West Germany in one embodiment of the present invention. PLC 42 outputs either logic low or logic high signals to output logic circuitry 66, 66a, 66b in accordance with the control input provided to and the operating program stored in the PLC 42. The output logic circuits 66, 66a, 66b are logic arrays in a preferred embodiment, with logic circuit 66b coupled to a plurality of interface relay control coils 70e within the interface circuitry 45 and logic circuit 66a coupled to analog multiplexers 68, 68a, 68b. The output logic 66 provides control/command inputs to the ramp/step generator 74. The output logic 66a provides control/command inputs to the analog multiplexers 68, 68a and 68b and scope command signals via interface circuitry 45. The output logic 66b provides signals to the interface relay control coils 70e for selectively pulling in the various relays therein.

The PLC 42 is indirectly coupled to and provides control for a programmable ramp/step generator 74 and various transmitters/simulators 76 within the process signal simulator/generator 44. In accordance with control inputs entered by an operator via the initiation keyboard 50 and the operating program stored within the PLC 42, the PLC provides appropriate control signals to the programmable ramp/step generator 74 for generating an appropriate ramp/step signal which is provided to the instrument loops/protection channels 46 within the protection system. Similarly, the transmitters/simulators 76 in response to appropriate control signals from the PLC 42 provide one or more process signals representing fixed operating parameters of the nuclear reactor power generating station 48. In some cases, the programmable ramp/step generator 74 may provide an appropriate ramp/step signal to the instrument loops/protection channels 46 while the transmitters/-simulators 76 do not provide an input to the instrument loops where it is desired to verify protection system operation in response to a single transient operating parameter which may be independent of other operating conditions within the nuclear reactor power generating station 48. With test signals simulating nuclear reactor operating conditions provided from the programmable ramp/step generator 74 as well as from the transmitters simulators 76 to the instrument loops 46, simulated signals are provided from interface relays 70a, through interface plug 70, to the instrument loops for monitoring the operation of the protection system as it processes the simulated signals representing one or more operating parameters of the power generating station 48. The simulated signals are also provided to multiplexer 68, which in accordance with control signals received from output logic 66a provide selected simulated input signals to the interface relay 70d. The selected simulated input signals are then provided to test, measurement and storage devices 47 for monitoring and evaluation along with output signals from the instrument loop 46 as described below.

In response to simulated process signal inputs from the interface relays 70a, the instrument loop under test outputs signals representing its operation under simulated conditions to the interface relays 70b, 70c. The interface relays 70b, 70c, in turn, provide the output signals from the instrument loop 146 to the multiplexers 68a, 68b, which, in accordance with the control signals received from the output logic 66a, provide selected protection system simulated operating signals to the interface relays 70d. The selected protection system simulated operating signals are then provided to one or more test, measurement and storage devices 47 for monitoring and evaluation by a system operator. The test, measurement and storage devices 47 may include such conventional measurement and display devices as digital voltmeters 80 and digital oscilloscopes 82 and possibly the video display (CRT) 81 of a computer terminal. The Nicolet 4094 digital oscilloscope is used in a preferred embodiment of the present invention. The signals provided to the test, measurement and storage devices 47 which represent simulated operation of an instrument loop 46 in the protection system under actual operating conditions, may also be provided to various data storage devices 84 such as magnetic discs or tapes for storage thereon and later recall. In this manner, the operation of the various components of the various instrument loops 46 in the protection system over a range of simulated operating conditions may be permanently stored in memory and comparisons made over time. This allows operating trends of the instrument loops 46 in particular as well as of the protection system in general to be analyzed over time in order to permit early detection of potentially dangerous conditions and allow for appropriate corrective action.

Figure 4:
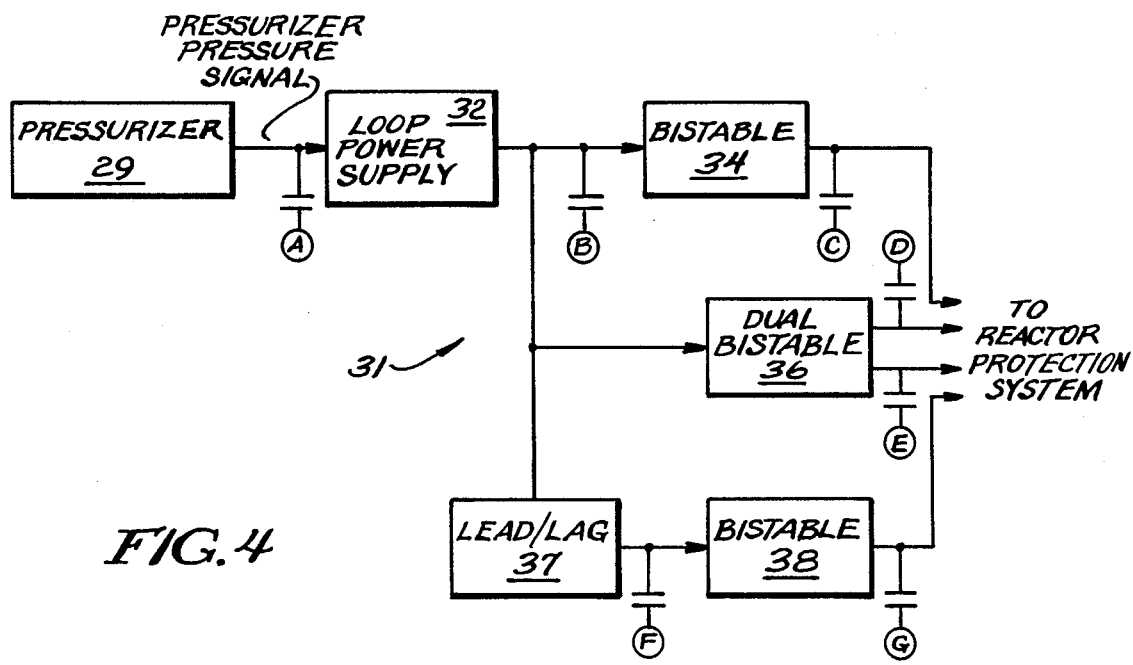
FIG. 4 illustrates in simplified schematic and block diagram form a protection channel of a conventional pressurized water reactor electric generating station with which the reactor control system verification arrangement of the present invention is intended for use.

Referring to FIG. 4, there is shown in simplified schematic and block diagram form a typical instrument loop or protection channel 31 with which the verification system of the present invention is intended for use. The protection channel 31 illustrated in FIG. 4 is the pressurizer pressure channel as used in a pressurized water reactor (PWR) electric generating station. The protection channel input is a pressure signal from a pressurizer 29, which signal is indicative of the reactor coolant system pressure. The signal is provided via an instrument loop power supply 32 directly to first and second bistable trip circuits 34 and 36 and, via a lead/lag circuit 37, to a third bistable strip circuit 38. A portion of the protection channel 31 comprised of the pressurizer 29, the loop power supply 32, the lead/lag circuit 37 and the third bistable trip circuit 38 is similar to the prior art sensor monitoring system 10 illustrated in FIG. 1. The lead/lag circuit 37 thus performs a dynamic compensating function for signals having a finite response time associated therewith. In many conventional pressurized water reactors, there are three additional pressurizer pressure loops similar to the instrument loop illustrated in FIG. 4, with each loop providing a respective input to the reactor's protection system. It typically requires an activation of two of the four channels to generate a full reactor trip. To perform verification of one of these instrument loops, it is necessary to isolate the loop and trip its output bistable circuits to simulate a partial trip. For this reason, it is important to conduct a verification of the instrument loop in a timely and efficient manner. Those portions of the protection channel 31 where a test signal may be applied or signals monitored are indicted by the letters A, B and F, while the trip output of the protection channel is monitored at locations C, D, E and G.

Figure 5A:
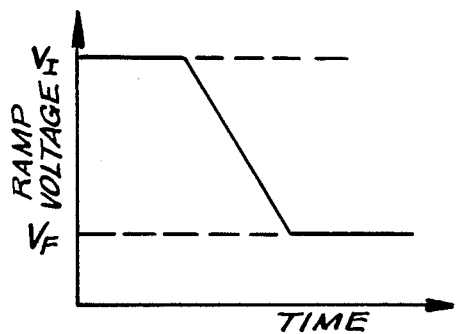
FIGS. 5a, 5b and 5c respectively illustrate (a) the variation with time of a transducer output ramp signal representing a change in a reactor system parameter which is controlled by a protection system, the operation of which may be verified by the present invention, and (b) the trip and (c) reset voltages of a trip circuit responsive to the transducer output signal for controlling the operation of the reactor protection system.
Figure 5B:
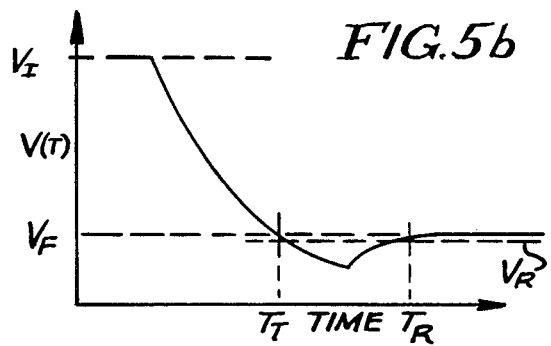
Figure 5C:
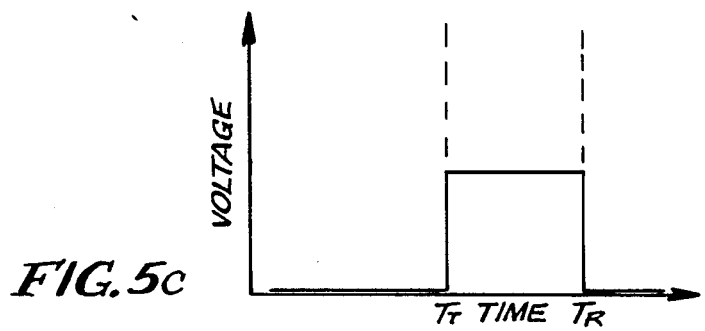

Referring to FIGS. 5a, 5b and 5c there are shown various signals within that portion of the protection channel 31 which includes the lead/lag circuit 37 and the third bistable trip circuit 38. FIG. 5a illustrates the variation of a ramp voltage provided by the programmable ramp/step generator 74 to the protection channel 31 of FIG. 4 at the input to the loop power supply 32 (point A). This decreasing ramp voltage simulates the output of the pressurizer 29 in the instrument loop 31 in terms of the variation of a time dependent state variable sensed by a transducer within the instrument loop. Although the ramp voltage is shown in FIG. 5a as decreasing with time, the present invention equally as well contemplates an increase in the voltage (or current) representing the time dependent state variable.

In response to a time varying simulated pressurizer pressure signal provided to the loop power supply 32, the power supply outputs a signal proportional to the simulated pressurizer pressure signal. The lead/lag circuit 37 which, in turn, dynamically compensates for the appreciable response time of the instrument loop. In one embodiment, the lead/lag circuit 37 processes the input signal provided thereto in a manner mathematically represented by the following equation:

$$V(T)=(V+RR\times\{T+(L-L)\times[1-EXP(-T/T_{LAG})]\})$$

where
T = Time
$T_{LAG}$ = Lag time
L—L = Lead-lag
RR = Ramp rate
V = Input voltage V(T) is primarily a function of the ramp rate (RR). The other parameters on the right hand side of the equations are of generally fixed value as determined by the circuitry of the protection channel 46. V(T) is graphically illustrated in FIG. 5b and represents a lead function of the ramp voltage which is determined by the ramp rate. The variation of V(T) with the ramp rate (RR) allows the protection channel 46 to compensate for excessive ramp rates corresponding to large transients in a time dependent state variable. For the case illustrated in FIG. 5b, V(T) initially decreases rapidly through the final ramp voltage $V_F$, reaches a minimum value, and then increases slightly with time as could be measured at point F in FIG. 4.

FIG. 5c illustrates the output of the protection channel 46 such as provided at point G in FIG. 4 to which the ramp voltage of FIG. 5a is applied. As shown in FIGS. 5b and 5c, when V(T) decreases to a value equal to $V_F$, the protection channel 46 outputs a trip voltage pulse at time $T_T$. With the trip voltage pulse output by the third bistable trip circuit 38 in the protection channel 31 a shutdown signal is provided to the power generating station. When V(T) increases to a value equal to or greater than $V_F$, a reset signal is provided by the trip circuit 38 to the power generating station in order to re-initiate its operation and allow it to again assume normal operation. The time at which the trip voltage is output by the protection channel 46 is represented as $T_T$, while the reset time is designated as $T_R$ in FIGS. 5b and 5c.

Figure 6:
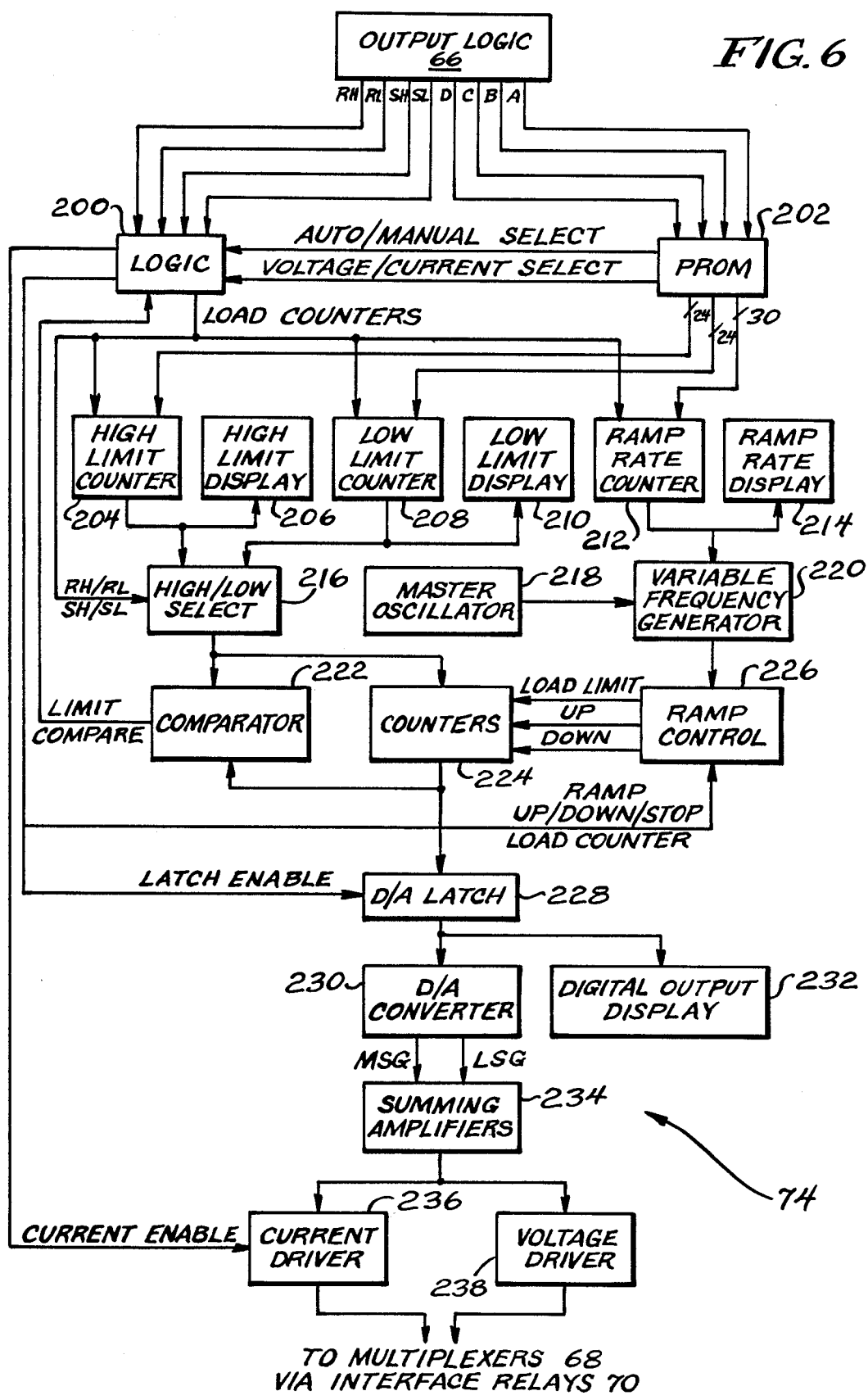
FIG. 6 is a simplified block diagram of a programmable ramp/step generator used in a preferred embodiment of the reactor control system verification arrangement illustrated in FIGS. 3a and 3b.

Referring to FIG. 6, there is shown in simplified block diagram form a programmable ramp/step generator 74 for use in a preferred embodiment of the reactor control system verification arrangement of the present invention. As previously described with respect to FIGS. 3a and 3b, the programmable ramp/step generator 74 is coupled to and receives control signal inputs from the output logic circuit 66. In one embodiment, eight control inputs are provided from the output logic circuit 66 to the programmable ramp/step generator 74. The A, B, C and D inputs to the programmable ramp/step generator 74 are provided to a programmable read only memory (PROM) 202 therein. The PROM 202 is programmed to be responsive to the four inputs provided thereto from the output logic circuit 66 for determining four operating parameters of the programmable ramp/step generator 74: (1) ramp rate; (2) high ramp/step limit; (3) low ramp/step limit; and (4) whether the output from the programmable ramp/step generator 74 will be provided by a current driver 236 or a voltage driver 238 therein. The programmability of the PROM 202 provides a high degree of flexibility in terms of operation of the programmable ramp/step generator 74, including the capability to operate either in a stepwise or a virtually continuous manner, wherein a continuum of ramp rates may be output by the programmable ramp/step generator 74.

The four remaining inputs to the programmable ramp/step generator 74 from the output logic circuit 66 comprise ramp high (RH), ramp low (RL), step high (SH), and step low (SL) signals. These four inputs are provided to a logic circuit 200 within the programmable ramp/step generator 74 which is comprised of a plurality of logic gates (not shown) for processing the aforementioned four control signals. Two additional input signals are provided to the logic circuit 200 from the PROM 202. These two signals are the AUTO/MANUAL SELECT signal and a VOLTAGE/CURRENT SELECT signal. When in a manual mode of operation, the logic inputs to the PROM 202 are low. If any of these input lines go high, the PROM 202 provides an appropriate signal to the logic circuit 200 for automatic operation of the programmable ramp/step generator 74 in accordance with the various inputs provided thereto from the output logic circuit 66. With the programmable ramp/step generator 74 in the automatic mode of operation, the program stored in the programmable logic controller inhibits manual control switches on the control panel and readout display 54 illustrated in FIG. 6a and described below. With the logic inputs to the ramp generator's PROM 202 low, a user may enter inputs via the programmer keyboard for manually controlling the operation of the ramp generator. The PROM 202 also provides a VOLTAGE/CURRENT SELECT signal to the logic circuit 200 for determining whether the output of the programmable ramp/step generator 74 is to be provided by its current driver circuit 236 or its voltage driver circuit 238.

The PROM 202 is further coupled to a high limit counter 204, a low limit counter 208, and a ramp rate counter 212 for providing control inputs thereto. The logic circuit 200 provides load signals to each of the aforementioned counters. Thus, in accordance with the output signals from the PROM 202, either the high limit counter 204 or the low limit counter 208 will be selected and the ramp rate counter 212 will be provided with the desired ramp rate information. Next, either the high limit counter 204 provides an appropriate control signal to a high limit display 206, or the low limit counter 208 provides an appropriate signal to a low limit display 210, for providing an operator with a visual indication of either the high or low ramp limit. The high limit and low limit displays 206 and 210 are provided for on the control panel and readout display 54 as described below. In addition, either the high limit counter 204 or the low limit counter 208 provides a counter limit signal to a high/low select circuit 216. The logic circuit 200 also provides a control signal to the high/low select circuit 216 representing either a ramp high or ramp low or a step high or a step low control function. Similarly, the ramp rate counter 212 provides an input signal to a ramp rate display 214 as well as to a variable frequency generator 220. The ramp rate display 214 is also on the control panel and readout display 54 and provides a visual indication of the ramp rate of the programmable ramp generator 74. A fixed frequency master oscillator 218 also provides an input to the variable frequency generator 220. The output frequency of the variable frequency generator 220 is proportional to the input signal provided thereto from the ramp rate counter 212 and thus varies as this input changes. The variable frequency output of the frequency generator 220, which changes in accordance with the desired ramping rate, is provided to a ramp control circuit 226 which, in turn, provides three outputs to a plurality of counters 224. The outputs from the ramp control circuit 226 to the counters 224 include two control signals: (1) a load limit signal which establishes the ramp limit, either high or low and (2) either an up or a down signal indicating that the voltage or current is to be either increased or decreased. Another input from the high/low select circuit 216 indicates to the counters 224 whether the voltage or current is to be changed in a ramping manner or a stepwise sequence. In response to either a ramp up or a ramp down input from the ramp control circuit 226, the counters 224 are either incremented or decremented.

The counters 224 provide an input to a comparator 222 which compares the voltage or current output from the counters with either the high or low ramp limit provided from the high or low limit counters 204, 208 via the high/low select circuit 216 to the comparator. The comparator 222 then provides a limit compare input to the ramp/step generator's logic circuit 200 which, in turn, provides an appropriate control signal to the ramp control circuit 226. The input from the logic circuit 200 to the ramp control circuit 226 is either a ramp up or ramp down signal which continues until the comparator 222 detects that the ramping voltage or current output from the counters 224 equals either the high or low ramp limit, whereupon the logic circuit 200 provides a stop signal to the ramp control circuit 226 for terminating the ramping of the counters 224. The ramp generator logic circuit 200 also provides a load counter signal to the ramp control circuit 226 for initiating the loading by the ramp control circuit into the counters 224 of the start ramp value as well as either the high or low ramp limit.

The ramping output of the counters 224 is provided to a digital-to-analog (D/A) latch 228 which receives a latch enable input from the ramp generator's logic circuit 200. The latch enable input to the D/A latch 228 clocks the ramp signal from the counters 224 to a D/A converter 230 in a manner which ensures that the data being loaded into the D/A converter is in a steady state wherein none of the bits are in a transition condition. The D/A latch 228 thus provides a timing delay in the digital data provided to the D/A converter 230 to ensure that the signals are stable thus eliminating timing problems arising from signal propagation delays. The D/A latch 228 also provides a signal representing the value of the voltage or current ramp signal to a digital output display 232 to provide an operator with a visual indication of the ramping voltage or current value.

The D/A converter 230 converts the digital output of the D/A latch 228 to an analog signal which is provided to a plurality of summing amplifiers 234 which, in turn, provide a corresponding signal which changes in frequency at the selected ramping rate to a current driver 236 as well as to a voltage driver 238. A current enable signal is provided to the current driver 236 from the ramp generator's logic circuit 200 when the PROM 202 provides a current select signal to the logic circuit. The current enable signal allows the current driver circuit 236 to output either an upward or downward current ramping signal to interface relays of the verification system via the multiplexers as shown in FIGS. 3a and 3b. When the PROM 202 provides a voltage select signal to the ramp/step generator's logic circuit 200, the logic circuit, in turn, does not provide a current enable signal to the current driver 236, allowing the voltage driver circuit 238 to provide a ramping voltage to the interface relays. The current enable signal to the current driver circuit 236 provides a feedback path in the programmable ramp/step generator 74 and affords protection for the current driver circuit. Thus, when the programmable ramp generator 74 is in the ramp voltage mode of operation, the current driver 236 is essentially an electronic high impedance and will not be shorted out if connected in circuit.

The programmable ramp/step generator 74 is thus capable of providing a continuous range of either voltage or current ramping rates between upper and lower limits, which in one embodiment are from 0.1 millivolt to 12.999 volts. The continuous range of ramp values as well as the upper and lower current or voltage ramp limits may be programmed into the ramp/step generator's PROM 202. Finally, the programmable ramp/step generator 74 offers entirely automatic operation under the control of its logic circuit 200 and its PROM 202 as well as manual operation wherein the upper and lower ramp limits as well as the ramp rate may be selected by an operator as described below.

Figure 6A:
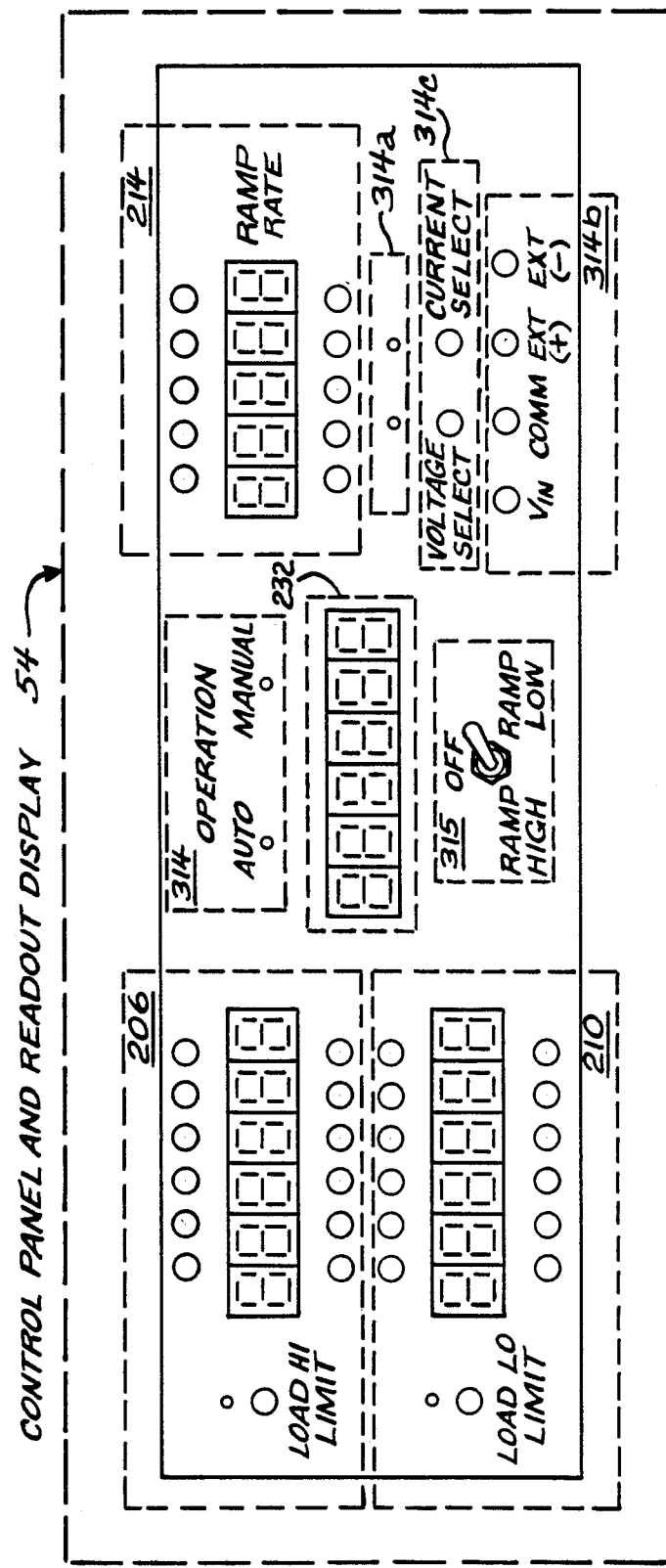
FIG. 6a is a simplified schematic diagram of a control panel and readout display used in a preferred embodiment of the process signal simulators and ramp/step generator.

Referring to FIG. 6a, there are shown additional details of the control panel and readout display 54 illustrated in FIGS. 3a and 3b for use in the process signal simulator/ramp/step generator 74 employed in one embodiment of the present invention. The control panel and readout display 54 includes auto/manual indicators 314 for indicating the operation of the programmable ramp/step generator 74 between an automatic mode and a manual mode of operation. In the manual mode of operation, a selector switch 315 is provided for controlling the direction either high or low of the ramp. The ramp rate in volts per minute is visually displayed on an alphanumeric character display 214 which forms part of the control panel and readout display 54. Also included in the control panel and readout display 54 is a step high selector and display 206 and a step low selector and display 210. With manual mode selected by means of the program stored in the PLC 42 of FIGS. 3a and 3b, the ramp rate may be manually selected by switches located above and below the ramp rate indicator 214 and the ramp direction may be either upward or downward as selected by ramp high and low selector 315. Also included on the control panel and readout display 54 are auto indicators 314a that indicate if the voltage or current mode has been selected by the program stored in the PLC and manual output connections 314b for outputting to extenal devices (not shown). Also included on the control panel and readout display 54 are manual voltage select or current select switches 314c and a visual display of the ramping voltage or current value 232.

Figure 7:
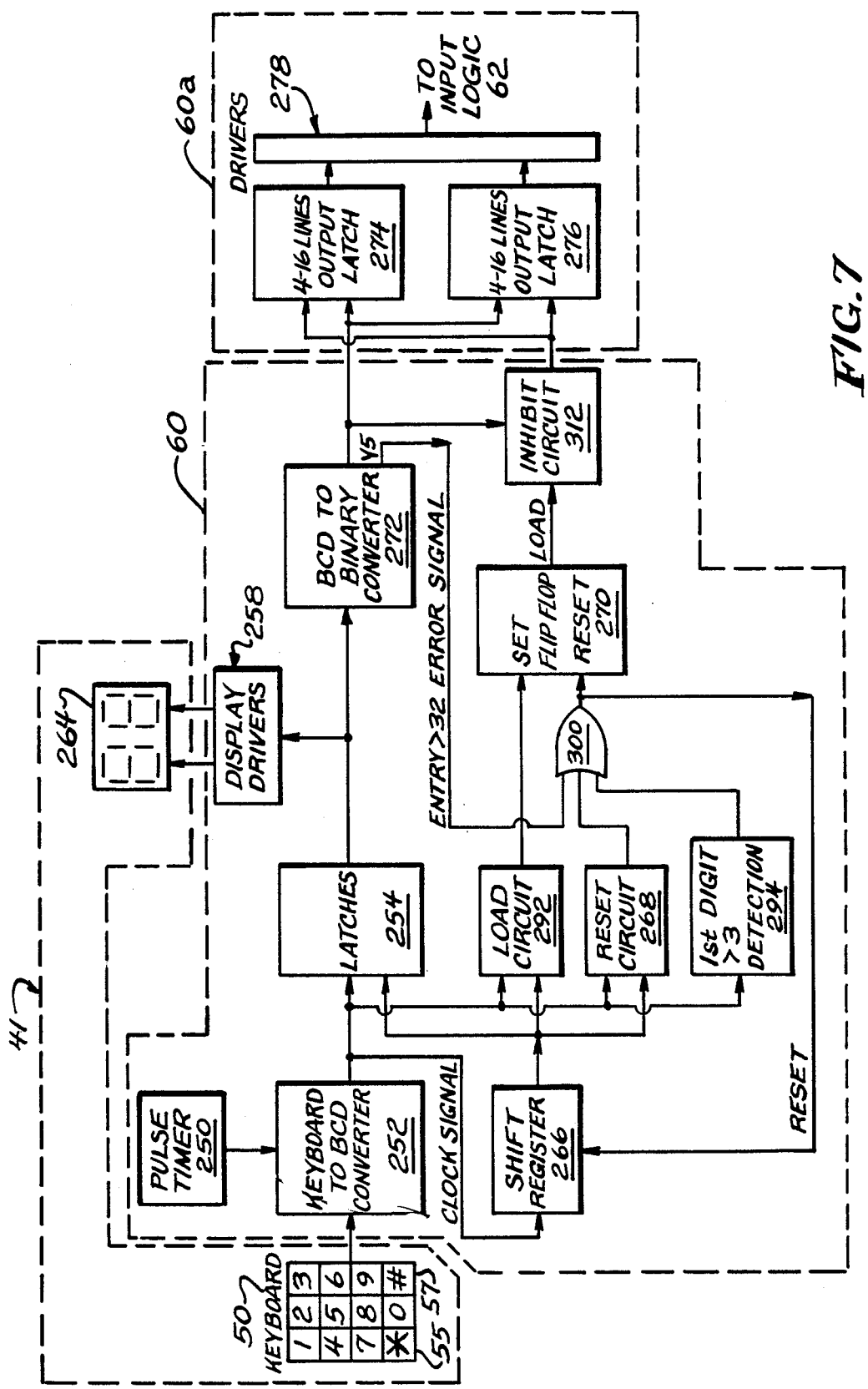
FIG. 7 is a simplified schematic and block diagram illustrating portions of a programming/control sequencer, an encoder circuit, and keyboard driver circuit used in a preferred embodiment of the reactor control system verification arrangement illustrated in FIGS. 3a and 3b.

Referring to FIG. 7, there is shown in schematic and block diagram form portions of a programming/control sequencer 41, an encoder circuit 60, and a keyboard driver circuit 60a used in a preferred embodiment of the present invention. As previously described with respect to FIGS. 3a and 3b, the programming/control sequencer 41 includes a programmer keyboard 52 which is not shown in FIG. 7 for simplicity. A test sequence is started by the entering of a four digit code on the programmer keyboard via the keys thereon, which are not shown in FIG. 7 for simplicity, but are illustrated in FIGS. 3a and 3b. The four digit code specifies which instrument loop or protection channel is to be tested and what test is to be run. The operator then initiates operation of the programming/control sequencer 41 by selection of keys (FOO) on the programmer keyboard 52. At this point the programming/control sequencer 41 checks to see that the channels are in test and connected properly. If the channels are in test and connected properly the programming/control sequencer 41 turns on a green "GO" light 264a shown in FIGS. 3a and 3b and allows injection of test signals. Individual test sequencers are started by entering a two digit code on the initiation keyboard 50 via the keys thereon. The two digit code specifies the points in the protection loop or protection channel to be tested. The operator then initiates the test by selection of a load key 57 on the initiation keyboard 50. From this point on, the sequencer directs the test automatically. The sequence is as follows:

A. Various test points are accessed and activated in the protection channel by interface relays 70a, 70b, 70c.

B. Sequence wait and loop settling timers 42b in the PLC 42 are energized as necessary.

C. The digital oscilloscope 82 is transferred from "hold" to "live" mode.

D. The programmable ramp generator 74 is prompted on.

E. The digital oscilloscope 82 is transferred from a "live" mode to a "hold last" mode of operation.

F. When the test run is complete, the digital oscilloscope 82 transfers the test data into memory by transmitting the data to the data storage devices 84.

G. The operator then interrupts the test results for acceptance. If the values are incorrect and not within tolerance, the operator troubleshoots the instrument loop or protection channel using previously recorded test data or traces.

Operator initiated entries on the initiation keyboard 50 are provided to a binary coded decimal (BCD) encoder 252 within the encoder circuit 60 which encodes the outputs from the initiation keyboard into binary signals. The binary outputs from the BCD encoder 252 are provided to a plurality of latches 254 as well as to a reset circuit 268, a load circuit 292, and a first digit greater than (3) detection circuit 294.

Upon the entry of a digit between 0 and 9 on the initiation keyboard 50, the BCD encoder 252 provides a clock signal to a shift register 266 which, in turn, provides latching signals to the latches 254 for latching data representing the selected digit into the latches. Upon selection of another number between 0 and 9, the shift register 266 also latches that information into the latches 254. If the load key 57 is selected prior to entry of a second digit on the initiation keyboard 50, the BCD encoder 252 will not output a strobe signal to the shift register 266 in preventing latching of this information into the latches 254. Upon selection of the load key 57, the binary output of the BCD encoder 252 is provided to the various logic gates in the load circuit 292. Load circuit 292 decodes the binary output from the BCD encoder 252 and provides a corresponding signal to the SET input of a flip-flop circuit 270. The output of flip-flop 270 represents a LOAD command provided via an inhibit circuit 312 to 4-to-16 binary decimal decoders 274 and 276. Thus, when the load key 57 is selected, load circuit 292 provides a high SET input to flip-flop 270 which, in turn, provides a LOAD signal to the pair of 4-to-16 decoders 274 and 276 for providing keyboard entries to a plurality of drivers 278. The output of the drivers 278 is, in turn, provided to the input logic 62 in the logic circuitry 43 for processing control/process signals as illustrated in FIGS. 3a and 3b.

Selection of a reset key 55 on the initiation keyboard 50 provides an appropriate output from the BCD encoder 252 which is decoded by the reset circuit 268. The reset circuit 268, in turn, provides a RESET signal via OR gate 300 to the RESET input of flip-flop 270 for the resetting thereof. In addition, the RESET signal is provided back to the RESET input of shift register 266 which terminates the load signals to the latches 254. The reset key 55 would typically be selected upon completion of a test and during subsequent analysis of the test data.

If the load key 57 is selected prior to the selection of two digits on the initiation keyboard 50, the BCD encoder 252 will not provide a strobe signal to the clock input of the shift register 266 and keyboard entries will be prevented from being latched into the latches 254. A second digit must be entered on the initiation keyboard 50 prior to the entry of a LOAD command via the load key 57. The load circuit 292 must receive verification from the shift register 266 that a second digit has been entered before accepting the LOAD command.

An oscillator circuit 250 coupled to the BCD encoder 252 provides proper timing therefor. The outputs from the latches 254 representing operator inputs on the initiation keyboard 50 are also provided via a display driver circuit 258 to a plurality of light emitting diode (LED) indicators 264 on the readout display. The BCD information output from the latches 254 is also converted from BCD to binary form by a BCD-binary decoder 272 prior to being inputted to the 4-to-16 decoders 274 and 276. The Y5 output of the BCD-binary decoder 272 is fed back to one input of OR gate 300 for providing a RESET output from OR gate 300. The RESET output from OR gate 300 is provided to the RESET input of the load flip-flop 270 for terminating the output load signal to inhibit circuit 312 and discontinuing the loading of data into the 4-to-16 decoders 274 and 276. Similarly, the RESET output from OR gate 300 is provided to the RESET input of shift register 266 for preventing further latching of data entered on the initiation keyboard 50 into the latches 254. In this manner, entry of a second digit exceeding predetermined upper limits as detected by the BCD-binary decoder 272 is precluded. In this manner, system operation may be defined in terms of a predetermined number of valid operating instructions entered by a system operator and erroneous and arbitrary entries are prevented. In one embodiment, the maximum permissible numerical entry on the initiation keyboard 50 is the number 31. If the first digit entered on the initiation keyboard 50 is greater than 3, the first digit greater than 3 detector 294 provides a reset signal to OR gate 300 which, in turn, provides reset functions as described above.

Figure 7A:
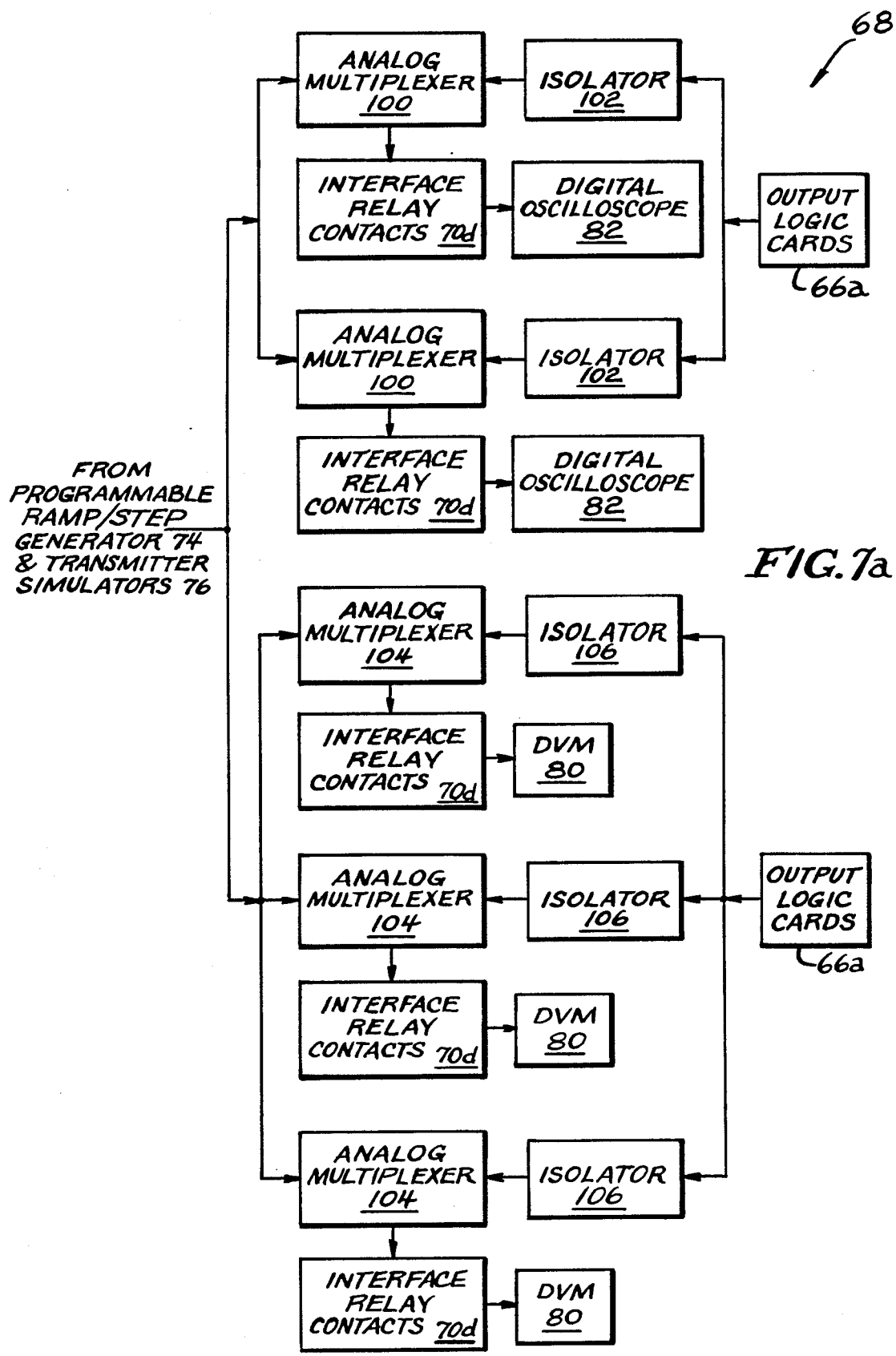
FIG. 7a is a simplified block diagram of portions of a programmable logic controller, test and measurement apparatus, and interface circuitry used in a preferred embodiment of the reactor control system verification arrangement illustrated in FIGS. 3a and 3b.

Referring to FIG. 7a, there is shown in simplified block diagram form portions of a programmable logic controller, test and measurement apparatus, and interface circuitry used in a preferred embodiment of the present invention. The ramp/step generator and transmitter simulators 74 and 76 shown in FIGS. 3a and 3b provide selected protection system simulated signals to analog multiplexers 100. In accordance with selected control signals from output logic 66a, via isolators 102, the analog multiplexers 100 provide selected protection system simulated signals via the interface relays 70d to one or more digital oscilloscopes 82, as also shown in FIGS. 3a and 3b. Also the ramp/step generator and transmitter simulators 74 and 76 provide selected protection system simulated signals to analog multiplexers 104. In accordance with selected control signals from the output logic circuit 66a, via a respective isolator circuit 106, the analog multiplexers 104 provide selected protection system simulated signals via the interface relays 70d to one or more digital voltmeters 80.

Figure 7B:
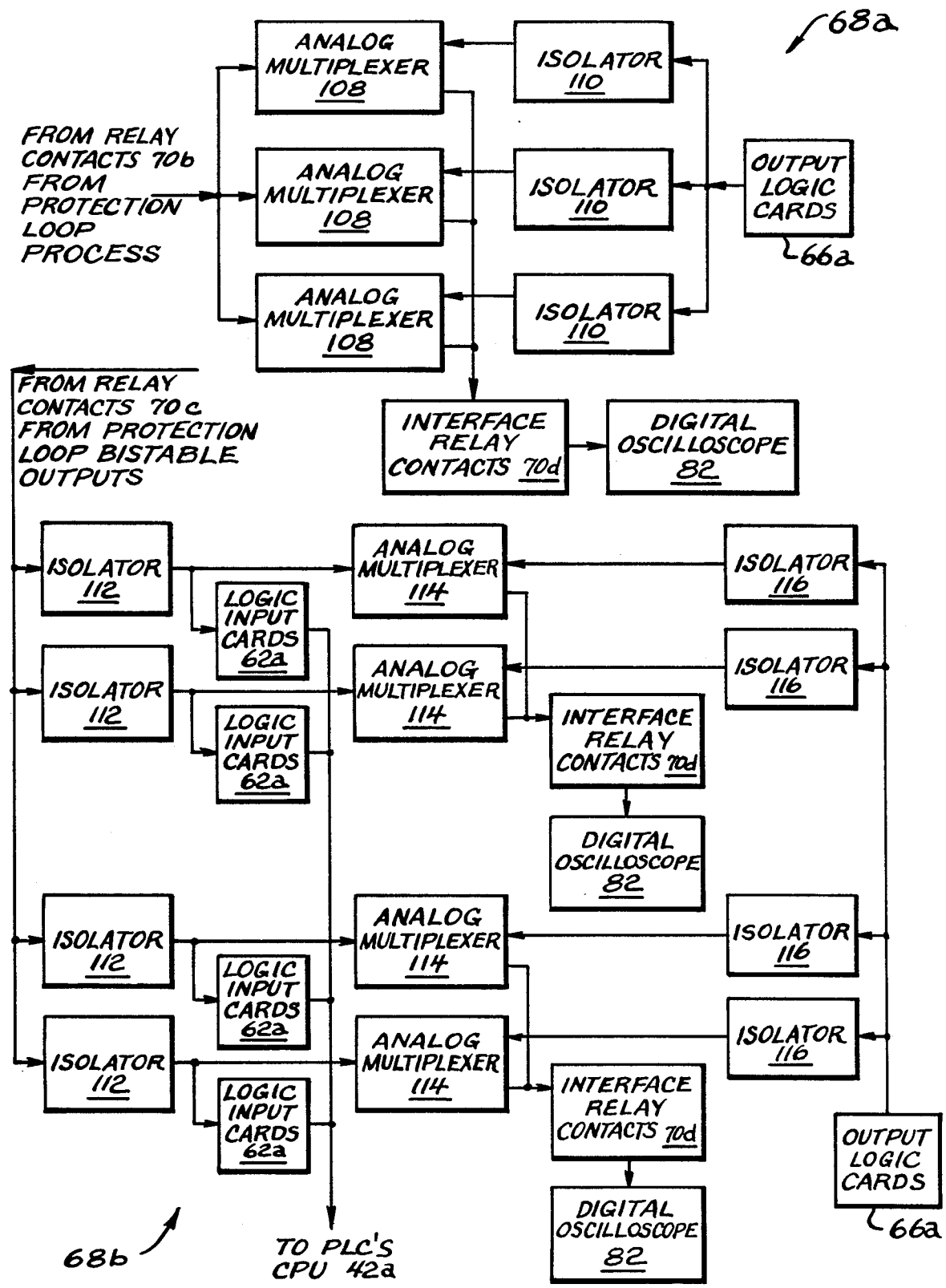
FIG. 7b is a simplified block diagram of portions of a programmable logic controller, test and measurement apparatus, and interface circuitry used in a preferred embodiment of the reactor control system verification arrangement illustrated in FIGS. 3a and 3b.

Referring to FIG. 7b, there is shown in simplified block diagram form portions of a programmable logic controller, test and measurement apparatus, and interface circuit used in a preferred embodiment of the present invention. In response to simulated signal inputs from interface relays 70a, the instrument loop 46 under test outputs process signals representing its operation under simulated conditions to interface relays 70b and 70c, as shown in FIGS. 3a and 3b. The interface relays 70b provide process signals from the instrument loop under simulated test to analog multiplexers 108. In accordance with selected control signals from the output logic circuit 66a provided via isolators 110, the analog multiplexers 108 provide selected protection process signals to interface relay 70d and thence to one or more channels of the digital oscilloscopes 82. The interface relays 70c, shown in FIGS. 3a and 3b, provide process bistable outputs from the instrument loop under simulated test to isolators 112 for level reduction, then to analog multiplexers 114 and to logic cards 62a. The analog multiplexers 114 provide process bistable outputs in accordance with selected control signals received from output logic 66a, via isolators 116, to interface relays 70d and thence to one or more channels of the digital oscilloscopes 82. The process bistable outputs from interface relay 70c to isolators 112 and to logic input 62a, referred to above, provide bistable logic levels to the programmable logic controller 42, as shown in FIGS. 3a and 3b. In conjunction with an operator selected program stored in the memory of the programmable logic controllers's CPU 42a, the logic levels inputted from logic input 62a to the CPU 42a are compared and provide loop-in-test verification.

Figure 8:
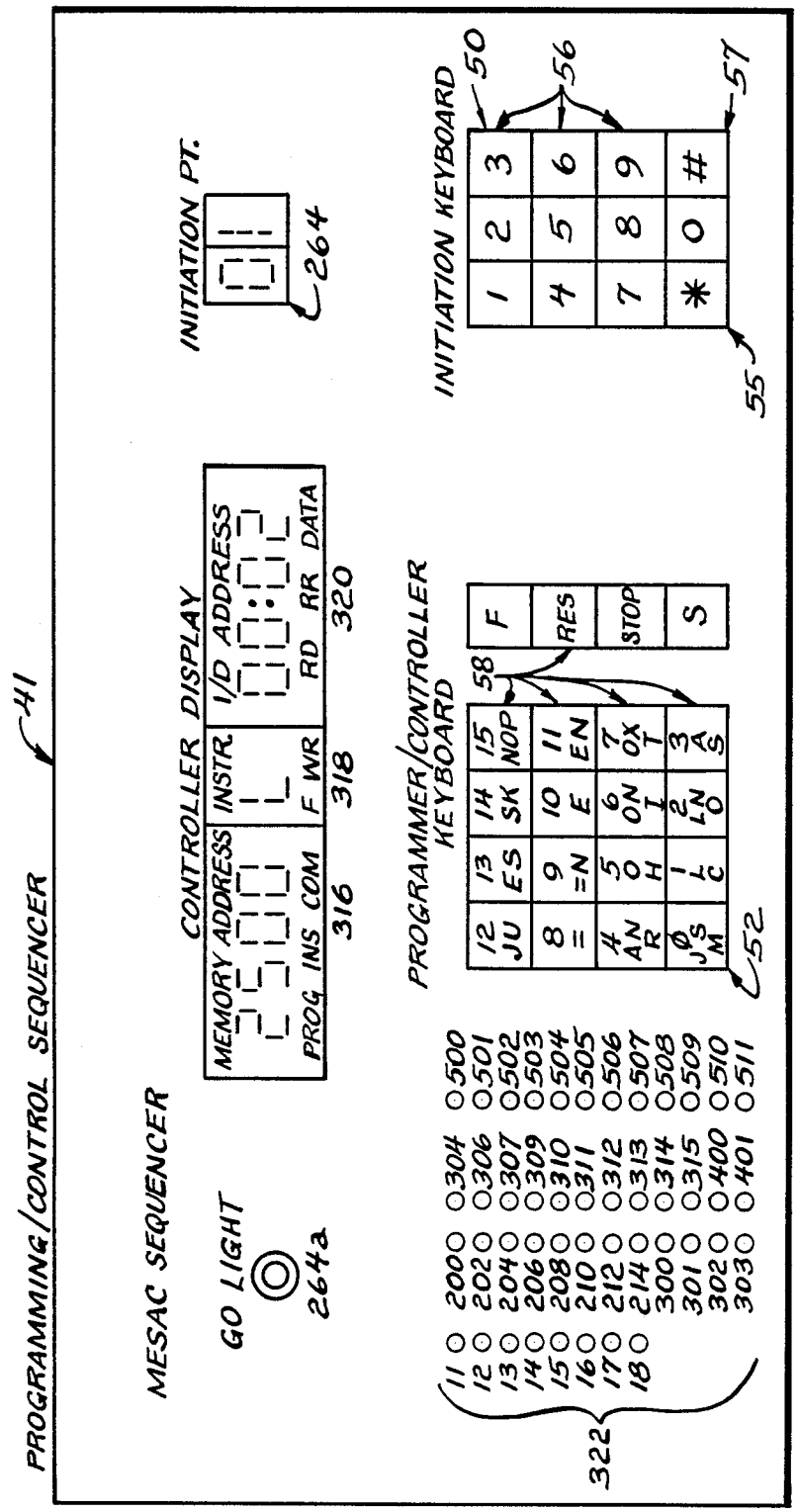
FIG. 8 illustrates the control panel of the programming/control sequencer used in a preferred embodiment of the present invention.

Referring to FIG. 8, the programmer/control sequencer 41 as previously described includes a programmer keyboard 52 having a plurality of key pads 58 and an initiation keyboard 50 having another plurality of keys 56. Two of the keys, or key pads, in the initiation keyboard 50 are the reset key 55 and the load key 57, the functions of which were described above. The GO light 264a, when green, indicates that the operational program within the programmable logic controller 42 has verified proper interface connection of plug 70 to process instrumentation 46 and bistable levels from instrument loops 46 are correct, as shown in FIGS. 3a and 3b, and that the verification system is ready for normal operation.

The readout display portion of the programming-/control sequencer 41 control panel further includes a current address display 316 which displays the address in memory at which the program in the programmable logic controller is currently operating, a mnemonic display 318 for displaying a coded mnemonic symbol of the instruction being executed by the programmable logic controller, and a data address display 320 for displaying the address to which the data is to be sent or received via an I/O bus. Also included is an initiation point display 264 for displaying a number representing the identification of the test being conducted by the verification system. Finally, the programming/control sequencer 41 further includes a plurality of display LED's 322 for providing a visual indication of verification that the test being conducted by the verification system is testing the desired locations within the instrument loop or protection channel.

Referring to FIG. 9, there is shown in simplified schematic and block diagram form an arrangement for verifying the proper connection of plug 70 to plug 39 in coupling the interface circuitry 45 to the protection channels 46. As shown in the figure, the plug 39 includes four terminals designated BB, CC, DD and EE. A +VDC is applied to each of the aforementioned terminals via respective pull-up resistors 328, 330, 332 and 334. Terminal BB is coupled to neutral ground potential. Therefore, with a +VDC applied to each of the terminals and with terminal BB coupled to neutral ground potential, a 4-bit coded signal of 0111 is provided from plug 39 via the interface plug 70, interface relays 70a, pull up 62b, and input logic 62a to the programmable logic controller 42 as shown in FIGS. 3a and 3b. The programmable logic controller is programmed to respond to an input code of 0111 by setting a first mark or flag in its operating program. The setting of a mark in the programmable logic controller may be illustrated with reference to FIG. 10a. As shown in FIG. 10a, each of the terminals BB, CC, DD and EE is represented as a relay or contact. Grounded terminal BB is represented as a closed relay. Once the relay combination illustrated in FIG. 10a is detected by the programmable logic controller, the programmable logic controller sets a first mark indicating that the interface plug 70 is properly connected to the protection channels 46. The relay arrangement of FIG. 10a thus functions as an AND gate for verifying proper connection of the interface plug 70 and setting a first mark in the programmable logic controller when proper plug connection is verified.

The same approach can be taken to verify that the proper instrument loop or protection channel is in test. Referring to FIGS. 10a and 10b, yet another relay INT 01 may be used to represent the output of the instrument loop which is to be tested. When the output from the desired instrument loop is detected following the input of a test signal thereto, another relay INT 01 is closed and is arranged in series with still another relay which is closed when the first mark MARK 1 is set upon proper connection verification. Thus, when the two relays illustrated in FIG. 10b, which are coupled in series, are closed upon proper plug connection verifications and proper loop in test verification, a second mark MARK 2 will be set by the programmable logic controller in its operating program. In this manner, connector verification and loop-in-test verification are provided by the programmable logic controller in the verification system of the present invention.

Referring to FIGS. 11a, 11b and 11c there is shown the sequence of operations carried out by the verification system 40 under the control of the programmable logic controller 42 in accordance with an operating program stored therein. FIGS. 11a, 11b and 11c each illustrate only a portion of the operating program in the programmable logic controller 42, with FIG. 11b intended for attachment to FIGS. 11a and 11c at the locations designated by letters (A) through (F). In the flow chart represented in FIGS. 11a, 11b and 11c a rectangle indicates either the start of an operational sequence or an instruction, or set of instructions, resulting in the performance of a control function, while a diamond indicates a decision point based upon a comparison of binary signals within the programmable logic controller.

Operation of the program stored in the programmable logic controller 42 is initiated at step 350 by selection by an operator of keys F and 3 on the programmer keyboard 52. The start address of the instrument loop or protection channel is also then entered on the programmer keyboard 52 followed by engagement of the "S" key on the programmer keyboard whereupon the operating program within the programmable logic controller 42 steps to the previously selected start address in the programmable logic controller's memory. The proper start address is verified by displaying it in the start address display 316 on the programming/control sequencer control panel 41. Following display of the start address, the operator then enters F00 on the programmer keyboard 52 to initiate operation of the programmable logic controller 42. The F00 command represents the starting command of the programmable logic controller's operating program.

The first step in the operating program involves the enabling of the input and output registers at block 354. The program then proceeds to step 356 and performs the previously described connector verification test in verifying proper connector coupling to the protection channel being tested. If the connector is improperly coupled to the protection channel, a mark will not be set within the programmable logic controller and the program branches back to step 356 and again checks for proper coupling of the connector. If at step 356 proper connector coupling is verified, a mark will be set within the programmable logic controller and the program proceeds to step 358.

At step 358, the programmable logic controller 42 opens the outputs from the comparator or trip circuit, which is also known as the bistable circuit, within the protection channel being tested. The outputs from the comparator circuit within a protection channel typically include a reference voltage signal which indicates tha the protection channel is in test. After the outputs from the comparator circuit are opened, the program proceeds to step 360 and conducts the loop-in-test procedure previously described in order to verify that the protection loop, or loops, are in test. If the connector mark has previously been set at step 356 and the protection channel or channels, are in test as determined at step 360, the program sets a "GO" mark latch within the programmable logic controller 42 and proceeds to step 362. If at step 360 testing of the proper protection channel and loop-in-test is not verified, the program executes a loop until the proper protection channel is coupled to the verification system and the loop-in-test procedure is verified.

Figure 1:
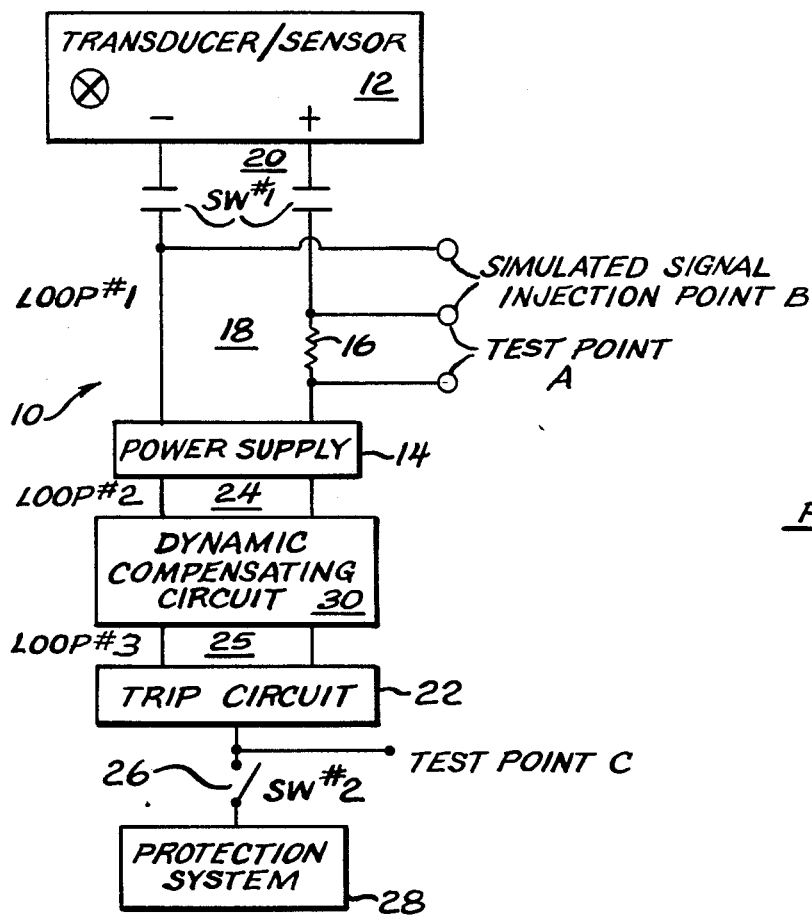
FIG. 1 is a simplified block and schematic diagram of a typical prior art sensor monitoring arrangement and method as used in a power generating nuclear reactor.

At step 362, following verification of proper connector coupling and protection channel loop-in-test, the programmable logic controller causes the green "GO" light 264a on the readout display 41 to be illuminated and enables the critical output logic cards in the output logic circuits 66, 66a and 66b. In addition, the input loop test points of the protection channel to be tested, such as test points A and B in the protection channel of FIG. 1, are opened.

At step 364, the program waits for entry by an operator on the initiation keyboard of the required initiation point. The required initiation point is represented by a two digit entry on the initiation keyboard 50 for designating the locations therein corresponding to the desired test functions.

The program in the programmable logic controller 42 then checks for setting of the GO mark or flag in the program at step 366. The program executes a loop at step 366 until the setting of the GO mark is detected and then proceeds to step 368 for opening the process input test points of the protection channel to be tested. Following opening of the test points in the protection channel to be tested, the programmable logic controller 42 then sends via the output logic 66 the proper address to the programmable ramp/step generator 74 to enable the programmable ramp/step generator to output the correct test signal to the protection channel 46 via the interface relays 70a and interface plugs 70 at step 370.

Following step 364 after the required initiation point is entered on the initiation keyboard 50 and is provided to the programmable logic controller 42, the program in the programmable logic controller branches to step 384, step 424, and step 372 for carrying out the various subroutines associated therewith simultaneously. Each of these separate subroutines is described individually in the following paragraphs. The programmable logic controller 42 includes a plurality of timing circuits or timers 42b for executing various timing functions within the program operations described below. For simplicity, the timers 42b is shown as a single block although various timing circuits are involved in carrying out the operations described below. Therefore, while these various timing circuits are shown as a single block 42b, it is understood that the timers include step low and high timers, ramp high and low timers, a loop settling timer, a sequence wait timer, a scope live pulse timer, and a scope hold last pulse timer. Each of the aforementioned timers and the timing function associated therewith are also discussed in the following paragraphs. The programmable logic controller's central processing unit (CPU) 42a includes a memory within which is stored its operating program.

When the program branches to step 424, the program next determines whether a ramp high commnd or a ramp high mark has been inputted. If at step 424, it is determined that a ramp high command has entered, or a ramp high mark set, the program proceeds to step 426 and determines whether a sequence wait mark has been set and executes a loop until this mark is set. At step 426a, the program determines that the ramp low timer mark is not set and executes a loop until this mark is set. If the ramp low timer mark is not set, the program proceeds to step 428 and provides a ramp high signal from the programmable logic controller 42 via the output logic 66 to the programmable ramp/step generator 74 for ramping the voltage or current output therefrom upward.

If at step 424, it is determined that ramp high has not been selected or that the ramp high mark is not set, the program branches to step 430 and determines if ramp low has been selected or if the ramp low mark has been set. If it is determined at step 430 that either the ramp low has been selected or the ramp low mark has been set, the program proceeds to step 432 and determines whether the sequence wait has been set. If at step 430 the program determines that ramp low has not been selected or that ramp low mark is not set, the program executes a loop until either of these conditions is satisfied. If at step 432, the setting of the sequence wait mark is not detected, the program executes a loop until this mark is set and then proceeds to step 432a to determine if the ramp high timer mark has not been set and executes a loop until this mark is set. If the ramp high timer mark is not set, step 434 provides a ramp low signal from the programmable logic controller 42 via the output logic 66 to the programmable ramp/step generator 74 for ramping the output of the programmable ramp/step generator downward.

Following the entry of the required initiation point at the initiation keyboard 50 at step 364, another of the subroutines executed by the program is initiated at step 372. The program at step 372 determines whether a step low signal is required to be provided by the programmable logic controller 42 to the programmable ramp generator 74. If at step 372 it is determined that a step low signal is to be provided to the programmable ramp generator 74, the program proceeds to steps 374 and determines if the GO mark has been set and executes a loop until the setting of this mark. Once the GO mark has been set, the program proceeds to step 376 and initiates operation of a step low timer within the programmable logic controller 42. The step low timer energizes the step low function generator at step 378 for stepping the programmable ramp/step generator 74 downward. The program then proceeds to step 380 in order to detect when the step low timer is timed out and the step low timing is complete. Once the step low timing is complete as detected at step 380, the program proceeds to step 382 and deenergizes the step low command to the programmable ramp/step generator 74.

If at step 372 the program determines that a step low signal is not required to be provided to the programmable ramp/step generator 74, the program branches to step 414 and again determines whether the GO mark has been set. Once the setting of the GO mark is detected at step 414, the program proceeds to step 416 and initiates operation of a step high timer in the programmable logic controller 42 which, in turn, energizes a step high function at step 418. Both the step low and step high timers are variable hardware timers within the timers circuit 42b in the programmable logic controller 42 with external timer settings which determine whether the programmable ramp/step generator 74 is to be ramped either upward or downward. Following the energizing of the step high function at step 418, the program proceeds to step 420 for determining when the step high timer has timed out. Following timing out of the step high timer, the program proceeds to step 422 and deenergizes the step high command. Therefore, the step low and step high commands are respectively deenergized at steps 382 and 422.

Following the entering of the required initiation point on the initiation keyboard 50 at step 364, the program stored in the programmable logic controller 42 also branches to step 384 for executing a loop settling time subroutine. Loop settling time is required when the protection channel contains a dynamic function. When the protection channel does not contain a dynamic function the loop settling time subroutine is not required and would therefore not be performed. Thus, if at step 384 the program determines that the loop settling time is not required, the program branches down to step 392 in order to detect setting of the GO mark. If at step 384 it is determined that the loop settling time is required as in the case of dynamic function testing, the progam proceeds to step 386 and looks for the setting of the GO mark. Following detection of the setting of the GO mark at step 386, the program proceeds to step 388 and initiates operation of a loop settling timer which is another hardware timer in the timers circuit 42b within the programmable logic controller 42. The loop settling timer times out after all transients within the protection channel under test have been allowed to settle out. The program then proceeds to step 390, looks for the timing out of the loop settling timer, and proceeds to step 392 and checks for the setting of the GO mark following timing out of the loop settling timer. With detection of the setting of the GO mark at step 392, the program proceeds to step 394 and initiates operation of a sequence wait timer which introduces a delay of 5 seconds in the display of test data on the digital oscilloscope. This 5 second delay permits a full raster scan of the digital oscilloscope's cathode ray tube (CRT) to ensure a full video display of test data. Following the start of the sequence wait timer, the program then initiates the operation of a scope live pulse timer at step 396. The scope live pulse timer, as well as the previously discussed sequence wait timer, is a hardware timer within the timers circuit 42b in the programmable logic controller 42 which energizes the digital oscilloscope's CRT by energizing an oscilloscope live function at step 398.

After the digital oscilloscope is energized at step 398, the program then waits for the duration of the live pulse at step 400 before deenergizing the scope live function at step 402. By thus deenergizing the scope live function immediately following the end of the scope live pulse, the digital oscilloscope is activated by a single pulse and the requirement for a sustained signal to activate the digital oscilloscope is avoided.

After the scope live function is deenergized at step 402, the program then looks for completion of the sequence wait time and timing out of the sequence wait timer at step 404. Again, timing out of the sequence wait timer as detected at step 404 provides the timing delay necessary to ensure that a full raster is available for display of test data on the CRT, while operation of the scope live pulse timer and energizing of the scope live function permits the digital oscilloscope to be activated by a series of pulses rather than a sustained signal.

Following the timing out of the sequence wait timer at step 404, the program then executes a subroutine for sustaining the display of test data on the digital oscilloscope's CRT. Thus, at step 406, the operation of a scope hold last pulse timer is initiated and another pulse is provided to the digital oscilloscope by energizing a scope hold last function to permit the digital oscilloscope to continue to dislay data presented during the last raster scan of the CRT. The program then proceeds to step 410 where the timing out of the hold last pulse timer is detected for deenergizing the scope hold last function at step 412 and holding the test data displayed on the digital oscilloscope's CRT for evaluation.

Also following timing out of the sequence wait timer at step 404, the program proceeds to step 436 for execution of a bi-directional ramping operation, if desired. Thus, at step 436 the program determines whether a ramp low time is required, and if required, proceeds to step 438 and initiates operation of the ramp low timer in the timer circuit 42b of the programmable logic controller 42. At step 440, timing out of the ramp low timer is detected and downward ramping of the output of the programmable ramp generator 74 is initiated. On the other hand, if at step 436 it is determined that a ramp low time is not required, the program branches to step 442 and initiates operation of a ramp high timer. Timing out of the ramp high timer is determined at step 444 and upward ramping of the programmable ramp generator 74 is initiated.

Referring to the Appendix, there is shown typical dynamic calculations used in verifying the operation of the Westinghouse W7300 nuclear reactor control system in accordance with the reactor control system verification of the present invention. In the example presented in the Appendix, the pressurizer pressure loop 1P-0455 loop was selected for verification because this loop consists of dynamic and non-dynamic functions. In the instrument loop block diagrams in the Appendix, the instrument loop trip circuit is represented as the NAL card, the dynamic compensating or lead-lag circuit is represented as the NLL card, and the power supply circuit is represented as the NLP card. The Appendix sets forth linear equations for static circuit operation and nonlinear equations representing dynamic circuit operation. The test points at which simulated operating signals may be injected into an instrument loop and operation verification signals may be detected in the instrument loop are also illustrated in the various figures in this Appendix. The equations were used to derive the values set forth in the dynamic response table at the end of this Appendix. While the equations and calculations set forth in the Appendix are directed to verification of the operation of the pressurizer pressure loop in a nuclear reactor power station, similar equations and data tables may be used to verify the operation of different types of instruments loops in accordance with the principles of the present invention.

There has thus been shown a reactor control system verification arrangement which affords both static and dynamic testing of instrument loops in the protection system. In the case of dynamic testing, instrument loop response time can be verified. Testing of an entire instrument loop in situ without requiring the removal of individual circuit boards may be accomplished expeditiously and accurately. Test results may be presented on various display devices including a digital oscilloscope and may be stored in any of a variety of data storage devices for later recall and comparison with current instrument loop performance in order to provide detailed analysis of and predictions for future instrument loop operation.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An arrangement for verifying the in-place operation of a protection system, wherein said protection system monitors and controls the operation of an operating system and includes an instrument loop responsive to a time dependent state variable signal and having a characteristic response time, wherein said time dependent state variable signal represents a first operating parameter of the operating system for providing an operating system control signal, said arrangement comprising:

user responsive input means for generating first control signals;

programmable control means coupled to said instrument loop and to said user responsive input means and responsive to said first control signals for generating second control signals;

variable signal generating means coupled to said instrument loop and to said programmable control means and responsive to said second control signals for generating a simulated time dependent state variable signal and providing said simulated time dependent state variable signal to said instrument loop in response to which said instrument loop outputs said operating system control signal, wherein said simulated time dependent state variable signal does not compensate for the response time of the instrument loop and said operating system control signal is a shutdown signal for terminating operation of the operating system when said simulated time dependent state variable signal exceeds a predetermined limit;

display/test means coupled to said instrument loop and responsive to said operating system control signal for providing a visual display of said operating system control signal in verifying operation of the protection system; and detection means coupled to said instrument loop and responsive to a reset signal therefrom for verifying the resetting of said protection system whereupon operation of said operating system may be re-initiated when said simulated time dependent state variable signal no longer exceeds said predetermined limit.

2. The arrangement of claim 1 wherein said programmable control means includes logic circuit means coupled to said variable signal generating means for processing said first and second control signals respectively output from said user responsive input means and said programmable control means and for providing said first and second control signals to said programmable control means and to said variable signal generating means, respectively.

3. The arrangement of claim 2 wherein said programmable control means further includes a programmable logic controller coupled to said input means and to said logic circuit means.

4. The arrangement of claim 3 further including interface circuit means for coupling said logic circuit means, said instrument loop, said display/test means, and said variable signal generating means.

5. The arrangement of claim 4 wherein said interface circuit means includes a plurality of interface relays.

6. The arrangement of claim 4 wherein said logic circuit means includes a multiplexer circuit coupled to said interface circuit means.

7. The arrangement of claim 6 wherein said logic circuit means further includes an output logic circuit coupled to said multiplexer circuit, to said interface circuit means, to said variable signal generating means, and to said programmable logic controller.

8. The arrangement of claim 7 wherein said logic circuit means further includes an input logic circuit coupled to said input means, to said programmable logic controller, to said interface circuit means and to said output logic circuit.

9. The arrangement of claim 1 wherein said display/test means includes a digital oscilloscope.

10. The arrangement of claim 1 wherein said display/test means includes a digital voltmeter.

11. The arrangement of claim 1 wherein said display/test includes a cathode ray tube.

12. The arrangement of claim 1 further comprising data storage means coupled to said display/test means for storing said operating system control signal for subsequent recall and comparision with subsequent operation of said protection system.

13. The arrangement of claim 12 wherein said data storage means includes a disc storage device.

14. The arrangement of claim 1 wherein said instrument loop includes a transducer for detecting said time dependent state variable signal and a trip circuit coupled to the protection system for providing said operating system control signal thereto.

15. The arrangement of claim 14 further comprising means for providing said simulated time dependent variable signal between said transducer and said trip circuit in said instrument loop.

16. The arrangement of claim 15 wherein said instrument loop further includes dynamic compensating circuit means coupled between said transducer and said trip circuit for compensating for the response time of said time dependent state variable signal.

17. The arrangement of claim 16 wherein said dynamic compensating circuit means includes a lead/lag circuit.

18. The arrangement of claim 15 further including reset signal generating means for re-initiating operation of said operating system following its shutdown when said operating system control signal no longer exceeds said predetermined limit.

19. The arrangement of claim 1 wherein said variable signal generating means includes a variable ramp signal generator and said simulated time dependent state variable signal is a ramp signal.

20. The arrangement of claim 19 wherein said variable ramp signal generator is programmable and includes a programmable read only memory.

21. The arrangement of claim 19 wherein said ramp signal generator includes a continuously variable frequency generator for providing a continuously variable ramp signal.

22. The arrangement of claim 19 wherein said variable ramp signal generator includes high and low limit counters for respectively establishing an upper and a lower ramp signal limit.

23. The arrangement of claim 19 wherein said variable ramp signal generator includes variable ramp rate means for varying the ramp rate of said ramp signal.

24. The arrangement of claim 19 wherein said variable ramp signal generator includes a current driver and a voltage driver and means for selecting between said current driver and said voltage driver in allowing said variable ramp signal generator to provide a ramp signal varying in either current or voltage, respectively.

25. The arrangement of claim 1 further including transmitter/simulator means coupled to said instrument loop and to said programmable control means and responsive to said second control signals for providing at least one fixed signal to said instrument loop during verification of the operation of the protection system, wherein said at least one fixed signal represents a second operating parameter of the operating system.

26. The arrangement of claim 1 further including a plurality of instrument loops each responsive to a respective time dependent state variable signal representing one of a plurality of operating parameters of the operating system, wherein said variable signal generating means provides said simulated time dependent state variable signal to one of said instrument loops.

27. The arrangement of claim 26 wherein said user responsive input means includes selection means for providing a select control signal to said programmable control means for selecting one of said plurality of instrument loops to which said time dependent state variable signal is provided.

28. The arrangement of claim 1 wherein said user responsive input means includes a numbered multi-key keyboard and said arrangement further includes an encoder circuit for coupling said keyboard to said programmable control means.

29. The arrangement of claim 28 wherein said encoder circuit includes user entry verification means for defining a plurality of valid user entries and for rejecting invalid user entries on said keyboard in preventing unauthorized operation of the protection system verification arrangement.

30. The arrangement of claim 29 wherein said user entry verification means includes maximum entry number limiting means for limiting valid user entries to a given set of numbers.

31. The arrangement of claim 30 wherein said user entry verification means further includes two-key entry detection means for further defining a valid entry as comprised of two keyboard entries.

32. The arrangement of claim 28 wherein said user responsive input means further includes readout means responsive to user initiated inputs to said keyboard for displaying user entries on said keyboard.

33. The arrangement of claim 1 wherein said user responsive input means includes a first initiation keyboard for initiating operation of said protection system verification arrangement and a second programming keyboard for controlling the operation of said protection system verification arrangement.

34. The arrangement of claim 1 wherein said operating system includes a nuclear reactor power generating station.

35. In a nuclear reactor power plant including a protection system having transducer means for sensing an operating parameter of said power plant represented by a time dependent state variable signal for generating a shutdown signal in terminating operation of said power plant when the magnitude or rate of change of said time dependent state variable signal exceeds predetermined limits and for further generating a reset signal when said time dependent state variable signal no longer exceeds said predetermined limits whereupon operation of said power plant is re-initiated, wherein said transducer means has a characteristic response time, means for verifying operation of said protection system comprising:

input means responsive to user inputs for generating first control signals;
programmable control means coupled to said input means and responsive to said first control signals for generating second control signals;
ramp signal generating means coupled to said protection system and to said programmable control means and responsive to said second control signals for providing a time varying signal representing the time dependent state variable to the transducer means, wherein the characteristic response time of said transducer means is not compensated for by said time varying signal; and
detection/display means coupled to the protection system for measuring and displaying the response of the protection system to the time varying signal provided thereto and for detecting said shutdown signal when the magnitude or rate of change of said time dependent state variable signal exceeds said predetermined limits and said reset signal when said time dependent state variable signal no longer exceeds said predetermined limits.

36. In a nuclear reactor power plant having a protection and control system for monitoring various state variable of said power plant and controlling power plant operation, wherein said protection and control system has a characteristic time constant and includes an input end to which a time dependent state variable signal representing a power plant operating parameter is provided and an output end from which a shutdown signal is provided when said time dependent state variable signal exceeds a predetermined threshold for terminating operation of the power plant and from which a reset signal is provided when said time dependent state variable signal no longer exceeds said predetermined threshold for re-initiating operation of the power plant, a verification system for verifying in-place operation of said protection and control system comprising:

user responsive input means for generating a first control signal representing a selected power plant process and a first input signal representing a state variable associated with said power plant process;
controller means coupled to said input means and responsive to said first control and input signals for outputting a second control signal;
logic/interface circuitry coupled to said protection and control system and to said signal for providing a first process designation signal to said protection and control system and for generating a state variable designating signal;
simulation signal generating means coupled to the input end of said protection and control system and further coupled to said logic/interface circuitry and responsive to said state variable designating signal for generating and providing a dynamic signal simulating a state variable of said power plant to the input end of said protection and control system which, in turn, outputs the shutdown signal to said logic/interface circuitry when said dynamic signal exceeds the predetermined threshold and outputs the reset signal when said dynamic signal no longer exceeds the predetermined threshold, wherein the characteristic response time of the protection and control system is not compensated for by said dynamic signal; and measurement/display means coupled to said logic-/interface circuitry for measuring and displaying the shutdown and reset signals in verifying in-place operation of said protection and control system.

37. A method for the in-place monitoring and verification of the transient signal response of a protection/control arrangement having a characteristic response time and at least one protection channel coupled to an operating system and responsive to a state variable signal representing a first operating parameter of said operating system, said method comprising:

providing a selection signal in response to an operator input, said selection signal representing said state variable signal and a selected variation of said state variable signal;

providing a simulated state variable signal in response to said selection signal to said protection channel, wherein said said simulated state variable signal corresponds to said first operating parameter and a selected variation thereof and does not compensate for the characteristic response time of the protection/control arrangement;

measuring the response of said protection channel to said simulated state variable signal in detecting a shutdown signal from said protection channel when the response of said protection channel is not within predetermined limits and detecting a reset signal from said protection channel when the response of said protection channel is again within said predetermined limits, wherein said shutdown signal terminates operation of the operating system and said reset signal re-initiates operation of the system; and monitoring said simulated state variable signal and said shutdown and reset signals in verifying the in-place transient signal response of said protection/control arrangement.

38. The method of claim 37 further comprising the step of selectively varying said simulated state variable signal by causing it to ramp upward or downward.

39. The method of claim 38 further comprising the step of defining the upper and lower limits of the ramped simulated state variable signal.

40. The method of claim 38 further comprising the step of varying the ramp rate of the simulated state variable signal.

41. The method of claim 37 wherein said protection/control arrangement includes more than one protection channel and said method further includes selecting one of said protection channels for monitoring and verifying the transient signal response thereof from among said more than one protection channels.

42. The method of claim 41 further comprising the step of providing a simulated state variable signal to said selected one of said protection channels and providing simulated fixed signals to the remaining protection channels, wherein said simulated fixed signals correspond to various other operating parameters of said operating system.

43. The method of claim 42 further comprising the step of verifying that the protection channel to which said simulated state variable signal is provided is the selected one of said protection channels, the operation of which it is desired to monitor and verify.

44. The method of claim 37 further comprising the step of providing a video display of said simulated state variable and control signals.

45. The method of claim 44 further comprising the steps of measuring and displaying said simulated state variable and control signals on a digital oscilloscope.

46. The method of claim 37 further comprising the step of storing said simulated state variable and control signals for later recall and comparison with subsequent transient signal response of said protection/control arrangement.

47. The method of claim 37 wherein the step of measuring the response of said protection channel to said simulated state variable signal includes comparing the response of said protection channel with predetermined upper and lower limits and generating said control signal only when said simulated state variable signal exceeds either of said upper or lower limits.

48. The method of claim 47 wherein said control signal is a shutdown signal for terminating operation of said operating system when said simulated state variable signal exceeds either of said upper or lower limits.

49. The method of claim 48 further comprising the step of re-initiating operation of said operating system following termination of its operation upon receipt of said shutdown signal when said simulated state variable signal no longer exceeds either of said upper or lower limits.

50. The method of claim 37 further comprising the step of selecting between varying the current or the voltage of said simulated state variable signal.

51. The method of claim 37 comprising the steps of defining a plurality of valid operator inputs and providing a plurality of selection signals each corresponding to a respective valid operator input and further comprising the steps of detecting and rejecting invalid operator inputs.

52. The method of claim 51 further comprising the step of defining said plurality of valid operator inputs in terms of the number of user keyboard entries and a maximum number designated by the user keyboard entries.

53. The method of claim 37 further comprising the step of displaying operator inputs on a video display.

54. A programmable ramp/step generator comprising:

user responsive input means for receiving user-initiated inputs and providing first and second control signals in response thereto;

programmable memory means coupled to said input means for storing data representing operating parameters of the ramp/step generator, wherein data is read from said programmable memory means in response to receipt by said programmable memory means of said first control signals from said user responsive input means;

logic means coupled to said input means and to said programmable memory means and responsive to said second control signals and said data representing ramp/step generator operating parameters respectively output therefrom for providing third control signals; and ramp/step control means coupled to said logic means and to said programmable memory means and responsive to said third control signals and said data representing operating parameters of the ramp/step generator respectively output therefrom for providing a ramp/step output signal varying in either voltage or current.

55. The programmable ramp/step generator of claim 54 wherein said user-initiated inputs include a ramp high or ramp low signal or a step high or step low signal.

56. The programmable ramp/step generator of claim 54 wherein said programmable memory means is a programmable read only memory and said data represents ramp rate and high ramp/step or low ramp/step signals.

57. The programmable ramp/step generator of claim 56 further comprising display means coupled to said programmable memory means and to said logic means for providing a visual indication of the values of the data representing operating parameters of the ramp/step generator read from said programmable memory means as well as said third control signals output by said logic means.

58. The programmable ramp/step generator of claim 57 wherein said user responsive input means includes an automatic/manual mode selector and the data read from said programmable memory means and provided to said logic means includes an automatic/manual select signal and a voltage/current select signal.

59. The programmable ramp/step generator of claim 54 wherein said ramp/step control means includes a current driver and a voltage driver and means for switching therebetween.

60. The programmable ramp/step generator of claim 59 wherein said means for switching between said current driver and said voltage driver includes means for providing a current enable signal from said logic means to said current driver whereupon said programmable ramp/step generator provides a ramp/step output signal varying in current, and wherein said programmable ramp/step generator provides a ramp/step output signal varying in voltage in the absence of said current enable signal.

61. The programmable ramp/step generator of claim 54 wherein said ramp/step control means includes a plurality of counters responsive to the data read from said programmable memory means and said third control signals for establishing a high ramp/step limit or a low ramp/step limit and a ramp rate.

62. The programmable ramp/step generator of claim 61 wherein one of said plurality of counters is a ramp rate counter and said ramp/step control means further includes a variable frequency generator coupled to said ramp rate counter for providing a fourth control signal having a frequency proportional to the ramp rate and means for converting said fourth control signal to either a current or a voltage ramp output signal.

63. For use with a plurality of instrument loops monitoring the operation of a control system responsive to an operating state of a controlled system, wherein operation of an instrument loop is verified by providing an input signal simulating an operating state of said cotnrolled system to one of a plurality of first test points of said instrument loop and the response of said instrument loop is verified at a second test point of said instrument loop, a programming/control sequencer for controlling verification of said instrument loops comprising:

first user responsive input means for designating a selected one of said instrument loops for operation verification; and second user responsive input means for designating a selected one of said plurality of first test points of said selected one of said instrument loops to which said input signal is to be provided in verifying the operation of said selected one of said instrument loops.

64. The programming/control sequencer of claim 63 wherein said first user responsive input means includes a multi-key programmer keyboard.

65. The programming/control sequencer of claim 63 wherein said programming/control sequencer is coupled to the instrument loops by means of a multi-terminal plug, said programming/control sequencer further including means for verifying proper connection of said multi-terminal plug to the instrument loops.

66. The programming/control sequencer of claim 65 wherein said means for verifying proper connection of said multi-terminal plug to the instrument loops includes a grounded first terminal and a +VDC source coupled to the remaining terminals of the plug via a respective pull-up resistor and means for detecting the grounded first terminal of said plug.

67. The programming/control sequencer of claim 63 wherein said second user responsive input means includes a multi-key initiation keyboard.

68. The programming/control sequencer of claim 63 further comprising means for monitoring operation of said selected one of said instrument loops at various test points therein.

69. The programming/control sequencer of claim 68 further comprising video display means for providing a visual display of the operation of said selected one of said instrument loops at various test points therein.

70. The programming/control sequencer of claim 69 wherein said means for monitoring and displaying operation of said selected one of said instrument loops at various test points therein comprises a multi-channel digital oscilloscope.

71. The programming/control sequencer of claim 63 wherein said first and second user responsive input means respectively include a first programming and second initiation numbered multi-key keyboard.

72. The programming/control sequencer of claim 71 further including means for defining valid entries on said second initiation keyboard and for preventing operation of said programming/control sequencer when an invalid entry is made on said second initiation keyboard.

73. The programming/control sequencer of claim 72 wherein said means for defining valid entries on said second initiation keyboard includes means for detecting entry of at least two keys on said second initiation keyboard.

74. The programming/control sequencer of claim 73 wherein said means for defining valid entries on said second initiation keyboard further includes key number detecting means for inhibiting said second keyboard when selected key numbers exceed a predetermined numerical limit.

* * * * *

UNITED STATES PATENT AND TRADEMARK OFFICE
CERTIFICATE OF CORRECTION

PATENT NO. : 4,783,307

DATED : November 8, 1988

INVENTOR(S) : James J. Galligan, Harry W. Quinlan and Steven J. Hedden

It is certified that error appears in the above—identified patent and that said Letters Patent is hereby corrected as shown below:

Col. 1, line 55, after "rate, etc.", change "the" to -- The --.

Col. 2, line 28, change "sensors" to -- sensor --; and line 67, after "essential for", change "the" to -- their--.

Col. 3, line 27, after "compensation" insert -- reconfigured by shorting out the dynamic compensation --.

Col. 4, line 13, change "vertification" to -- verification --; and line 50, after "response" change "to" to -- of --.

Col. 7, line 14, change "transmit/receiver" to

-- transmit/receive --;

line 32, change "stystem" to -- system --; and line 48, after "figure" change "of" to -- for --.

Col. 9, line 6, after "loop", change "146" to -- 46 --; and line 68, change "indicted" to -- indicated --.

Col. 10, line 39, change "equations" to -- equation --.

Col. 14, line 3, change "extenal" to -- external --; and lines 29 and 30, change "sequencers" to -- sequences --.

UNITED STATES PATENT AND TRADEMARK OFFICE
CERTIFICATE OF CORRECTION

PATENT NO. : 4,783,307

DATED : November 8, 1988

INVENTOR(S) : James J. Galligan, Harry W. Quinlan and Steven J. Hedden

It is certified that error appears in the above—identified patent and that said Letters Patent is hereby corrected as shown below:

Col. 21, line 67, change "dislay" to -- display --.

Col. 26, line 52, after "and to said" insert -- controller means and responsive to said second control --.

Col. 29, lines 57 and 58, change "cotnrolled" to -- controlled --.

Signed and Sealed this

Thirtieth Day of May, 1989

Attest:

DONALD J. QUIGG

Attesting Officer

Commissioner of Patents and Trademarks